(12) United States Patent
Mulder

(10) Patent No.: US 11,618,686 B2
(45) Date of Patent: Apr. 4, 2023

(54) PERIODIC AMMONIA PRODUCTION

(71) Applicant: Technische Universiteit Delft, Delft (NL)

(72) Inventor: Fokko Marten Mulder, Delft (NL)

(73) Assignee: Technische Universiteit Delft, Delft (NL)

( * ) Notice: Subject to any disclaimer, the term of this patent is extended or adjusted under 35 U.S.C. 154(b) by 0 days.

(21) Appl. No.: 17/763,971

(22) PCT Filed: Sep. 25, 2020

(86) PCT No.: PCT/NL2020/050593
§ 371 (c)(1),
(2) Date: Mar. 25, 2022

(87) PCT Pub. No.: WO2021/060985
PCT Pub. Date: Apr. 1, 2021

(65) Prior Publication Data
US 2022/0371905 A1    Nov. 24, 2022

(30) Foreign Application Priority Data
Sep. 26, 2019   (NL) ..................................... 2023912

(51) Int. Cl.
*C01C 1/04*    (2006.01)
(52) U.S. Cl.
CPC .................. *C01C 1/0482* (2013.01)
(58) Field of Classification Search
CPC ....... C01C 1/0482; Y02E 60/36; Y02E 60/14; Y02P 20/133; Y02P 20/52
See application file for complete search history.

(56) References Cited

U.S. PATENT DOCUMENTS

| 4,319,626 A | * | 3/1982 | Papazian ................. F25B 30/04 165/104.12 |
| 4,668,494 A | | 5/1987 | Van Hook |
| 2012/0100062 A1 | | 4/2012 | Nakamura et al. |

FOREIGN PATENT DOCUMENTS

| EP | 2589574 A1 | 5/2013 |
| WO | 2017153304 A1 | 9/2017 |

OTHER PUBLICATIONS

International Search Report and Written Opinion in International Patent Application No. PCT/NL2020/050593 dated Dec. 10, 2020, 12 pages.

* cited by examiner

*Primary Examiner* — Steven J Bos
*Assistant Examiner* — Syed T Iqbal
(74) *Attorney, Agent, or Firm* — Smith Baluch LLP

(57) ABSTRACT

The invention provides a method (10) for ammonia production, the method (10) comprising: —reacting dihydrogen and dinitrogen (115) to form ammonia in a reactor (120); providing a reactor gas mixture (125) from the reactor (120) to a recycle loop (130), wherein the recycle loop (130) comprises or is functionally coupled to a separator (140); and providing at least part of the reactor gas mixture (125) from the recycle loop (130) to the reactor (120); and —switching between a first operation mode (20) and a second operation mode (30), wherein: in the first operation mode (20) dihydrogen and dinitrogen (115) are provided to the reactor (120), and the separator (140) provides a first fraction $F_1$ of the ammonia from the reactor gas mixture (125) to a product outlet (150); and in the second operation mode (30) the separator (140) provides a second fraction $F_2$ of the ammonia from the reactor gas mixture (125) to the product outlet (140); wherein the first fraction $F_1$ is larger than the second fraction $F_2$, and wherein the method (10)

(Continued)

comprises switching between the first operation mode (20) and the second operation mode (30) in dependence of dihydrogen availability to the reactor (120).

18 Claims, 4 Drawing Sheets

PERIODIC AMMONIA PRODUCTION

CROSS-REFERENCE TO RELATED APPLICATIONS

This application is a U.S. national stage filing under 35 U.S.C. 371 of PCT/NL2020/050593, filed Sep. 25, 2020, and entitled "Periodic Ammonia Production," which claims the priority benefit of NL Application No. 2023912, filed on Sep. 26, 2019, and entitled "Periodic Ammonia Production," each of which is incorporated herein by reference in its entirety.

FIELD OF THE INVENTION

The invention relates to a method for ammonia production. The invention further relates to a system for ammonia production.

BACKGROUND OF THE INVENTION

Methods for ammonia production are known in the art. For example, EP2589574A1 describes a method for regulation of an ammonia plant where a purge gas containing inerts is extracted from ammonia synthesis loop, and where the ammonia plant is operated at a partial load by keeping the ammonia synthesis loop at a nominal high pressure, and reducing the purge rate in order to increase concentration of inerts in the ammonia synthesis loop and avoid overheating of the ammonia reactor; preferably a water electrolysis section produces a hydrogen feed and an air separator produces a nitrogen feed; hydrogen and nitrogen are mixed to form a make up gas which is reacted at a high-pressure in said ammonia synthesis loop.

WO2017153304A1 describes a method and a system for synthesizing a product gas from a first reactant gas and a second reactant gas. The product gas is separated and non-converted reactant gas is conducted in the circuit. The volumetric flow rate of the first reactant gas, the second reactant gas, and/or the separated product gas is varied during the method. In this manner, temporary narrow passages can be bridged when energy or reactant gas is available. The two reactant gases can be hydrogen and nitrogen for example, and the product gas can be ammonia.

US2012100062A1 describes a combined plant of continuously supplying hydrogen and nitrogen to an ammonia synthesis facility that continuously synthesizes ammonia from hydrogen and nitrogen, the combined plant including: a hydrogen production facility for acquiring solar energy and producing hydrogen by utilizing a part of the acquired solar energy; a nitrogen production facility for producing nitrogen from air and supplying the nitrogen to the ammonia synthesis facility; and a hydrogen storage facility for storing the hydrogen produced by the hydrogen production facility and supplying the produced hydrogen to the ammonia synthesis facility.

U.S. Pat. No. 4,668,494A describes a method of using solar energy in a chemical synthesis process comprising steam reforming hydrocarbons or gasifying carbonaceous fuel, converting the product of the steam reforming of hydrocarbons or the gasifying of carbonaceous fuels to an ammonia synthesis gas, converting the ammonia synthesis gas to ammonia, supplying the heat required for the steam reforming of hydrocarbons or the gasifying of carbonaceous fuels by a heat transfer fluid, heating the heat transfer fluid in a solar receiver when solar energy is available, heating the heat transfer fluid by combusting a portion of the ammonia when sufficient solar energy is not available to supply the necessary heat to the heat transfer fluid.

SUMMARY OF THE INVENTION

Renewable energy from, for example, wind mills and solar panels may have an inherent variability due to weather conditions. Further, energy demand by consumers may also be variable over time, with users typically consuming more energy during the day than during the night. The production of renewable energy may alternate between being insufficient to cover consumer demands and being in excess of consumer demands. Hence, there may be a need for long-term storage of renewable energy.

During periods of excess of renewable energy, the energy may, for example, be used to generate dihydrogen ($H_2$) via electrolysis. $H_2$ may serve as a (long-term) energy storage gas. In addition, $H_2$ may further be subjected to the Haber Bosch process to generate ammonia ($NH_3$) by reaction with ($N_2$). The generated $NH_3$ may serve as a (long-term) energy storage liquid, which may be preferable to the gaseous $H_2$ due to more dense liquid energy storage.

However, a traditional Haber-Bosch ammonia plant may be designed to run essentially 100% of the time at essentially full capacity, wherein the plant reacts $H_2$ and $N_2$ to form ammonia ($NH_3$) using the well-known high temperature and high pressure Haber Bosch process. Due to aforementioned, and potentially other, variabilities in renewable energy generation, the $H_2$ and $N_2$ derived from renewable energy sources may not be available continuously.

However, discontinuous operation of a traditional Haber-Bosch ammonia plant may be problematic. In particular, discontinuous operation may result in temperature and/or pressure fluctuations, which may be detrimental to the catalyst, and may result in fatigue failure of a reactor operating at elevated temperature and pressure.

Hence, a production process for $NH_3$ production from renewable energy sources may require a built-in buffer to absorb fluctuations in the availability of renewable energy.

The prior art may describe a production process wherein $H_2$ is generated as a function of renewable energy availability, and wherein $H_2$ storage is used as a buffer. The $NH_3$ generation may then be made continuous by withdrawing $H_2$ from the $H_2$ storage buffer. The intermediate storage of $H_2$ may, however, require substantially more space and cost related to the large storage capacity cost than the direct storage of (liquid) $NH_3$ would require.

The prior art may further describe a production process wherein during renewable energy excess $H_2$ is generated from renewable energy sources using an electrolyser and provided to a Haber-Bosch reactor, and wherein during insufficient availability of renewable energy, inert gases are provided to the reactor to maintain reactor pressure and temperature. Thereby, the reactor may operate at below nominal capacity. However, the periodic addition and removal of inert gases to the reactor may require additional separation of the inert gases for the insertion, heating and pressurization to the required insertion conditions, and separation from the product stream. Such additional inert gas addition may therefore reduce energy efficiency and increase costs.

Hence, it is an aspect of the invention to provide an alternative method for ammonia production, which preferably further at least partly obviates one or more of above-described drawbacks. The present invention may have as object to overcome or ameliorate at least one of the disadvantages of the prior art, or to provide a useful alternative.

Hence, in a first aspect, the invention may provide a method for (intermittent) ammonia production. The method may comprise reacting dihydrogen and dinitrogen to form the ammonia in a (system comprising a) reactor. The method may further comprise providing a reactor gas mixture from the reactor to a recycle loop. In embodiments, the recycle loop may comprise or be functionally coupled to a separator. In further embodiments, the recycle loop may comprise a (separator) bypass. The separator may be configured for extracting ammonia from the reactor gas mixture. The method may further comprise providing at least part of the reactor gas mixture from the recycle loop to the reactor. Especially, the method may comprise switching between a first operation mode and a second operation mode. In the first operation mode dihydrogen and dinitrogen may be provided to the reactor, especially at a first supply rate $S_{a1}$. Further, in the first operation mode the separator may provide a first fraction $F_1$ of the ammonia from the reactor gas mixture to a product outlet. In the second operation mode dihydrogen and dinitrogen may be provided to the reactor at a second supply rate $S_{a2}$, especially wherein $S_{a1} > S_{a2}$. In the second operation mode the separator may provide a second fraction $F_2$ of the ammonia from the reactor gas mixture to the product outlet. Especially, the first fraction $F_1$ is larger than the second fraction $F_2$. In embodiments, the method may comprise switching between the first operation mode and the second operation mode in dependence of dihydrogen availability to the system, especially to the reactor.

The invention may provide the benefit that at full production, i.e., when renewable energy is abundant, the reactor may generate $NH_3$, and may separate $NH_3$ from unreacted $H_2$, $N_2$ using a separator, such as a cooling trap, wherein $NH_3$ may be removed from the system and the unreacted $H_2$ and $N_2$ may be recycled into the reactor. When availability of (renewable) energy is insufficient for full production, the $NH_3$ may essentially be recycled into the reactor together with the unreacted $H_2$ and $N_2$. Thereby, the reactor, especially an ammonia reaction catalyst in the reactor, may be kept operational in the reducing environment and also kept at suitable temperature and pressure. Once renewable energy sources are available again, normal operation can commence essentially directly as the reactor was maintained on a suitable temperature and pressure. The method may comprise reacting dihydrogen and dinitrogen to form the ammonia in a reactor. Reacting $H_2$ and $N_2$ to form ammonia (also: "$NH_3$") may be well-known to the person skilled in the art, for example via the Haber-Bosch process. In embodiments, the reactor may comprise a Haber Bosch reactor. In embodiments, the ammonia reaction catalyst may comprise a Haber Bosch catalyst, i.e. a catalyst (typically) used in a Haber-Bosch process.

The method may further comprise providing a reactor gas mixture from the reactor to a recycle loop. Essentially, during operation, the method may comprise continuously providing a reactor gas mixture from the reactor to the recycle loop. The method may comprise providing at least part of the reactor gas mixture from the recycle loop (back) to the reactor. Hence, in embodiments, the reactor may comprise a reactor outlet functionally coupled to the recycle loop, i.e., the method may comprise providing the reactor gas mixture from the reactor to the recycle loop via the reactor outlet. In further embodiments, the reactor may comprise a reactor recycle inlet functionally coupled to the recycle loop, i.e., the method may comprise providing at least part of the reactor gas mixture from the recycle loop to the reactor via the reactor recycle inlet. Especially, the reactor outlet and the recycle inlet are arranged at different locations (at the reactor), especially at essentially opposite sides of the reactor.

In embodiments, the recycle loop may comprise or be functionally coupled to a separator. The method may comprise providing at least part of the reactor gas mixture from the recycle loop to the separator, especially during part of the method, more especially in the first operation mode. In further embodiments, the method may comprise providing at least part of the reactor gas mixture from the recycle loop (directly) to the reactor and providing at least part of the reactor gas mixture to the separator. In further embodiments, the method may comprise providing at least part of the reactor gas mixture from the recycle loop to the reactor via the separator, especially in the first operation mode.

The separator may be configured for extracting ammonia from the reactor gas mixture. Hence, the method may comprise separating ammonia from the reactor gas mixture, especially during part of the method, more especially in the first operation mode, especially at the separator. The separator, especially the separator comprising a cooler, may be configured for cooling the reactor gas mixture such that $NH_3$ becomes liquid, i.e., the method may comprise separating ammonia from the reactor gas mixture by cooling the reactor gas mixture (at the separator). The separator may comprise or be functionally coupled to a product outlet, especially wherein the separator is configured to provide the (separated) (liquid) ammonia to the product outlet, i.e., the method may comprise providing the (separated) (liquid) ammonia from the separator to the product outlet.

In embodiments, the method may comprise providing at least part of the reactor gas mixture from the recycle loop to the reactor. In further embodiments, the method may comprise providing at least part of the reactor gas mixture from the recycle loop to the reactor via the separator. Especially, the method may comprise providing at least part of the reactor gas mixture from the recycle loop to the separator, wherein the method comprises separating (at least part of) the ammonia from the reactor gas mixture at the separator, and wherein the method comprises providing the (remaining) reactor gas mixture from the separator to the reactor.

In further embodiments, the method may comprise providing at least part of the reactor gas mixture from the recycle loop directly to the reactor, i.e., without first providing the reactor gas mixture to the separator. Hence, in embodiments, the recycle loop may comprise a (separator) bypass, especially wherein the separator bypass is configured such that the reactor gas mixture may be provided from the recycle loop to the reactor without passing the separator.

In embodiments, the method may comprise providing at least part of the reactor gas mixture to a connector, configured to distribute the reactor gas mixture between the bypass and the separator. In further embodiments, the connector may comprise a three-way valve. In practice, the method may comprise providing essentially all, such as ≥97%, especially ≥98%, such as ≥99%, including 100%, of the (received) reactor gas mixture from the connector to the separator during the first operation mode and providing essentially all, such as ≥97%, especially ≥98%, such as ≥99%, including 100%, of the (received) reactor gas mixture from the connector to the bypass during the second operation mode.

The method may comprise switching between a first operation mode and a second operation mode. The method may comprise switching between the first operation mode and the second operation mode dependent on predetermined criteria, such as a (dihydrogen and/or dinitrogen) supply rate $S_a$, or the dihydrogen availability, especially the availability of renewable energy sources.

In embodiments, the method may comprise switching to the first operation mode if dihydrogen availability is above a first predetermined threshold, and switching to the second operation mode if the dihydrogen availability is below a second predetermined threshold. For example, the method may comprise switching to the first operation mode if sufficient dihydrogen is available to operate the reactor in the first operation mode (at full capacity) for at least a predetermined time period, such as one hour, and the method may comprise switching to the second operation mode when the reactor can no longer be operated in the first operation mode.

In the first operation mode dihydrogen and dinitrogen may be provided to the reactor (from the supply), especially provided at a first supply rate $S_{a1}$. The first supply rate $S_{a1}$ especially refers to the dihydrogen and dinitrogen provided to the reactor from the supply, i.e., excluding any dihydrogen and dinitrogen provided to the reactor from the recycle loop. The dihydrogen and dinitrogen may be provided (from the supply) separately. Especially, the dihydrogen and dinitrogen may be provided premixed. The first supply rate $S_{a1}$ may vary over time, and may especially be dependent on dihydrogen availability, more especially on the availability of renewable energy sources. Hence, if ample dihydrogen is available, the first supply rate $S_{a1}$ may essentially equal a capacity supply rate $S_c$ at which the reactor operates at full capacity. If dihydrogen availability decreases, the first supply rate $S_{a1}$ may decrease accordingly and the first supply rate $S_{a1}$ may become lower than the capacity supply rate, such as $0.8S_c$. Especially, the first supply rate $S_{a1}$ may be in the range $0.15*S_c \leq S_{a1} \leq S_c$, especially in the range $0.25*S_c \leq S_{a1} \leq S_c$.

The term "full capacity" may herein refer to a (nominal) maximal capacity, i.e. the reactor may operate at essentially optimized conditions for ammonia synthesis.

The method may comprise switching between the first operation mode and the second operation mode based on the achievable supply rate $S_a$, which may essentially correspond to switching based on dihydrogen availability. In embodiments, the method may comprise switching between the first operation mode and the second operation mode in dependence of dihydrogen availability to the system, especially to the reactor. For example, the method may comprise switching to the second operation mode if the supply rate $S_a<0.5S_c$, such as $S_a<0.4S_c$, especially $S_a<0.3\ S_c$, such as $<0.25\ S_c$, especially $<0.2\ S_c$.

Hence, in the second operation mode dihydrogen and dinitrogen may be provided to the reactor (from the supply) at a second supply rate $S_{a2}$, especially wherein the second supply rate $S_{a2}<$the first supply rate $S_{a1}$. Hence, in embodiments, the second supply rate $S_{a2}<0.5S_c$, such as $S_{a2}<0.4S_c$, especially $S_{a2}<0.3\ S_c$, such as $S_{a2}<0.2S_c$, especially $S_{a2}<0.1S_c$, including 0. Similar to the first supply rate $S_{a1}$, the second supply rate $S_a$e may specifically refer to the dihydrogen and dinitrogen provided to the reactor from the supply, i.e., excluding any dihydrogen and dinitrogen provided to the reactor from the recycle loop.

In further embodiments, the method may comprise essentially only providing dihydrogen if the supply rate $S_a$ can be maintained above a threshold value, such as at least at $0.3\ S_c$, or at least $0.4S_c$, such as at least $0.5S_c$.

In further embodiments, the second supply rate $S_{a2}$ may essentially be 0.

During the second operation mode, the pressure in the reactor may be maintained by recycling $N_2$, $H_2$, and $NH_3$. Hence, $S_{a2}$ may be small, such as essentially 0. During the second operation mode, a (temperature-dependent) equilibrium between $N_2$, $H_2$ and $NH_3$ may establish resulting in effectively no forward or backward reaction. Hence, the pressure and temperature and pressure may reach a relatively stable state. In such a stable state, the equilibrium product mixture of $N_2$, $H_2$ and $NH_3$ may be considered inert (as no net reactions take place). In further embodiments, the second supply rate $S_{a2}$ may during at least part of the second operation mode be larger than 0 to maintain and/or increase the pressure in the reactor.

In the first operation mode the separator may provide a first fraction $F_1$ of the ammonia from the reactor gas mixture to a product outlet, i.e., the method may comprise separating a first fraction $F_1$ of the ammonia from the reactor gas mixture at the separator, and providing the first fraction $F_1$ from the separator to the product outlet. Hence, the reactor gas mixture may comprise an X amount of ammonia, and the separator may provide a first fraction $F_1$ of the X amount from the reactor gas mixture to the product outlet, wherein the remainder of the reactor gas mixture including $(1-F_1)*X$ of ammonia is provided to the reactor (via the recycle loop). The first fraction $F_1$ may especially essentially be the maximally separable fraction by the separator. For example, in embodiments the separator may comprise a cooler configured to separate ammonia from the reactor gas mixture through cooling and condensation. For example, if a volume of the reactor gas mixture comprising an X amount of ammonia passes through the separator, the separator may separate 0.8X of the ammonia from the volume of the reactor gas mixture. The remaining 0.2X of the ammonia, as well as the rest of the reactor gas mixture, may be provided back to the reactor (via the recycle loop) and may later be provided to the separator again. Typically, a separator may be configured to separate about 80-99% of the ammonia from the reactor gas mixture. The reactor gas mixture may typically comprise in the range of 4-35% ammonia, i.e., the amount of $N_2$ and $H_2$ that has reacted to $NH_3$ in the reactor may be 4-35% (also: "single pass rate"). In particular, the reactor gas mixture may comprise a relatively low $NH_3$ concentration as operation of the reactor initiates, which may be due to a relatively low reactor temperature, and the $NH_3$ concentration in the reactor gas mixture may increase with operational activity, such as up to about 35%.

The first fraction $F_1$ and the second fraction $F_2$ may especially refer to a vol. %.

In the second operation mode the separator may provide a second fraction $F_2$ of the ammonia from the reactor gas mixture to the product outlet. The second fraction $F_2$ may especially essentially be a minimally separable fraction by the separator. Hence, in embodiments, the separator may especially operate at low capacity in the second operation mode. Especially, the separator may be "off" in the second operation mode or may be bypassed. In further embodiments, the recycle loop may comprise a bypass, and the second operation mode may comprise providing the reactor gas mixture directly from the recycle loop to the reactor via the bypass, i.e., without passing the reactor gas mixture through the separator. Hence, in embodiments, the separator may be off in the second operation mode. In further embodiments, the separator may be bypassed in the second operation mode.

Hence, in embodiments, the first fraction $F_1$ is larger than the second fraction $F_2$.

In further embodiments, the first fraction $F1 \geq 5\%$, especially $\geq 10\%$, such as $\geq 30\%$, especially $\geq 60$, such as $\geq 95\%$, especially $\geq 98\%$, such as $\geq 99\%$. The first fraction F1 may essentially be as high as enabled by the separator. Generally, a higher value of the first fraction F1 may be preferred. In practice, separators used in ammonia production processes may typically enable a first fraction F1 of up to 90-99% during operation.

In further embodiments, the second fraction F2≤5%, especially ≤4%, such as ≤3%, especially ≤2%, such as ≤1%, including 0%. Especially, the second fraction F2 may essentially be zero.

During the second operation mode, losing ammonia from the reactor gas mixture, such as by condensation in the separator, may be undesirable due to a concomitant decrease in (reactor) gas pressure. Hence, the second fraction $F_2$ may be kept as low as possible.

Hence, in embodiments, during the second operation mode, the recycle loop may provide essentially all, such as ≥97%, especially ≥98%, such as ≥99%, including 100%, of the reactor gas mixture (back) to the reactor. In particular, the separator may be bypassed, resulting in the reactor gas mixture being (completely) recycled.

Hence, in embodiments, the method may comprise: reacting dihydrogen and dinitrogen to form ammonia in a reactor; providing a reactor gas mixture from the reactor to a recycle loop, wherein the recycle loop comprises or is functionally coupled to a separator; providing at least part of the reactor gas mixture from the recycle loop to the reactor; wherein the method comprises switching between a first operation mode and a second operation mode, wherein in the first operation mode dihydrogen and dinitrogen are provided to the reactor, and the separator provides a first fraction $F_1$ of the ammonia from the reactor gas mixture to a product outlet; and in the second operation mode the separator provides a second fraction $F_2$ of the ammonia from the reactor gas mixture to the product outlet; wherein the first fraction $F_1$ is larger than the second fraction $F_2$, and wherein the method comprises switching between the first operation mode and the second operation mode in dependence of dihydrogen availability to the reactor.

In embodiments, the dihydrogen and dinitrogen provided to the reactor may be pressurized, especially at a pressure of at least 100 Bar, such as at least 200 Bar, especially at least 250 Bar. Especially, the reactor may be functionally coupled to a compressor feed. The compressor feed may be configured to pressurize the dinitrogen and/or dihydrogen. The pressurization may provide heat, thereby resulting in pressurized and hot dinitrogen and/or dihydrogen, which may be provided to the reactor, especially via a supply.

In embodiments, the method may comprise operating the reactor at full capacity with a supply of dihydrogen and dinitrogen at a capacity supply rate $S_c$ i.e., the reactor may have a maximal operational capacity ("full capacity"), which can be obtained at a supply of dihydrogen and dinitrogen equal to the capacity supply rate $S_c$. However, during operation the supply of dihydrogen and dinitrogen may be at an achievable supply rate $S_a$, especially dependent on $H_2$ availability, which may especially vary over time. Especially, $S_a \leq S_c$. The achievable supply rate $S_a$ may specifically refer to the dihydrogen and dinitrogen provided to the reactor from the supply, i.e., excluding any dihydrogen and dinitrogen provided to the reactor from the recycle loop.

The term "achievable supply rate" may herein refer to the rate at which the supply can provide dihydrogen and dinitrogen to the reactor. The achievable supply rate may thus depend on the amount of dihydrogen and dinitrogen in intermediate hydrogen storage and intermediate dinitrogen storage, and may further depend on the availability of dihydrogen from renewable energy sources.

In further embodiments, the method may comprise operating the reactor in the first operation mode for $S_a>0.15S_c$, such as for $S_a>0.25S_c$, especially for $S_a>0.5S_c$, such as for $S_a>0.6S_c$, especially for $S_a>0.7S_c$, such as for $S_a>0.8S_c$, especially $S_a>0.9S_c$;

In further embodiments, the method may comprise operating the reactor in the second operation mode for $S_a<0.5S_c$ especially for $S_a<0.4S_c$ such as for $S_a<0.3S_c$ especially for $S_a<0.2S_c$ such as for $S_a<0.1S_c$.

In embodiments, it may be beneficial to operate the reactor in dependence of one or more external factors, i.e., there may be a range of values $S_a$ for which the reactor may either be operated in the first operation mode or in the second operation mode depending on one or more external factors, such as electricity costs and/or ammonia demand. Hence, in further embodiments, the method may comprise (i) operating the reactor in the first operation mode for $S_a$ above a first threshold value, (ii) operating the reactor in the second operation mode for $S_a$ below a second threshold value, and (iii) operating the reactor in either the first operation mode or the second operation mode for $S_a$ between the first threshold value and the second threshold value, especially in dependence of one or more external factors. Especially, the first threshold value is larger than the second threshold value. In further embodiments, the first threshold value may be $\geq 0.15S_c$, such as $\geq 0.25S_c$, especially $\geq 0.5S_c$, such as $\geq 0.6S_c$, especially $\geq 0.7S_c$, such as $\geq 0.8S_c$, especially $\geq 0.9S_c$. In further embodiments, the second threshold value may be $\leq 0.5S_c$, especially $\leq 0.4S_c$, such as $\leq 0.3S_c$, especially $\leq 0.2S_c$, such as $\leq 0.1S_c$. In further embodiments, the method may comprise operating the reactor in either the first operation mode or in the second operation mode for $0.1S_c \leq S_a \leq 0.9S_c$, especially $0.2S_c \leq S_a \leq 0.8S_c$, especially $0.3S_c \leq S_a \leq 0.7S_c$, especially $0.4S_c \leq S_a \leq 0.6S_c$. During the second operation mode, the reactor may be maintained at a suitable temperature by recycling the reactor gas mixture through the bypass without passing through the separator.

In further embodiments, the method may comprise determining the operation mode based on the dihydrogen availability and/or other predetermined criteria, such as, for example, the temperature. If the reaction temperature is becoming lower due to low reaction rate and low hot $H_2$ and $N_2$ feed then one may decide to recycle more of the hot reaction gas instead of cooling and separating out $NH_3$ before recycling.

In further embodiments, the method may comprise using a plurality of thresholds for switching between the first operation mode and the second operation mode. Especially, the threshold of $S_a$ to switch from the first operation mode to the second operation mode may be different from the threshold to switch from the second operation mode to the first operation mode. For example, the method may comprise switching from the first operation mode to the second operation mode when $S_a<0.3S_c$, and may comprise switching from the second operation mode to the first operation mode when $S_a>0.25 S_c$. In such embodiments, either the first operation mode or the second operation mode may be active at $S_a=0.28S_c$ depending on the previously crossed threshold. Hence, in embodiments, the method may display hysteresis.

In embodiments, the reactor may comprise an ammonia synthesis catalyst (also: "catalyst"). The ammonia synthesis catalyst may be configured to catalyze the conversion of dihydrogen and dinitrogen to ammonia.

In further embodiments, the ammonia synthesis catalyst may be selected from the group comprising an Fe-based catalyst and a Ru-based catalyst. The Fe-based catalyst may comprise K as a promotor and/or may comprise aluminum oxide. Furthermore K, Al, Ca, Si and Mg can be present in the iron based catalyst, as is known in the art and described in e.g. "Catalytic Ammonia Synthesis: Fundamentals and practice", edited by J. R. Jennings, ISBM 0-306-43628-0, 1991 Plenum Press New York, which is hereby incorporated herein by reference. Hence, the Fe-based catalyst may comprise one or more of Al, Ca, Si, and Mg. The (activated) ammonia synthesis catalyst may comprise iron in its reduced form with high surface area, and may comprise one or more other elements as oxides or ternary iron oxides, or any of the forms described in ammonia synthesis catalyst literature. In the pre-reduced catalyst material amounts of $K_2O$, $Al_2O_3$, CaO, $SiO_2$ may be present at 2-15 wt. %, where the remainder may be reduced Fe, $Fe_3O_4$, and FeO. During operation in the Haber Bosch reactor the $H_2$ presence at high T and P may keep the catalyst in a reduced state or may even reduce the catalyst further, which may be important for the catalytic activity, i.e., in a more reduced state the catalyst may be more active. A reaction mixture of $H_2$, $N_2$, and $NH_3$ may provide such a reducing and activating environment for the catalyst. This environment may need to be maintained in intermittent operation, especially during the second operation mode, to keep the catalyst active.

In further embodiments, the ammonia synthesis catalyst may comprise a Ru-based catalyst. A Ru-based catalyst may be beneficial as a Ru-based catalyst can work at relatively low temperature and pressure, for example at a lower temperature and pressure than an Fe-based catalyst. The Ru-based catalyst may be promoted by the presence of alkali metals such as K, Cs, Ba and the presence of alumina, magnesia and or Ca, Ba binary or ternary oxides like Ca—Al—O compounds. Hence, in embodiments, the Ru-based catalyst may comprise one or more of K, Cs, Ba, Al, Mg, Ca, Ba. Especially, the Ru-based catalyst may comprise a binary or ternary oxide of one or more of K, Cs, Ba, Al, Mg, Ca, or Ba. These promotor and support elements may be present as $K_2O$, $Cs_2O$, BaO, MgO, and $Al_2O_3$. Hence, in embodiments, the Ru-based catalyst may comprise one or more of $K_2O$, $Cs_2O$, BaO, MgO, and $Al_2O_3$. The nanostructured catalyst material may have a high specific surface area accessible by the gas reaction mixture, as is known in the art.

In further embodiments, the ammonia synthesis catalyst may comprise an Fe-based catalyst. An Fe-based catalyst may be preferred in view of cost since Fe is relatively cheap, for example the noble metal Ru may be substantially more expensive.

In specific embodiments, the catalyst may comprise $Sm_2O_3$ and/or CeO.

During the first operation mode, there may be excess heat production in the reactor, especially due to the exothermic ammonia synthesis reaction as well as the addition of hot dihydrogen and/or dinitrogen, whereas during the second operation mode, there may be cooling of the reactor due to the lack of aforementioned processes. The cooling may be detrimental to the activity of the reactor, especially to the activity of the ammonia synthesis catalyst and to the reaction rates that are achieved when the amount of $H_2$ and $N_2$ fed to the reactor increases some time later, such as during the first operation mode or the second operation mode with higher $H_2$ availability. In addition, the cooling may cause a reduction of the pressure in the reactor, i.e. an alteration of the mechanical forces. Hence, it may be beneficial to store heat during the first operation mode and to supply the stored heat (to the reactor and or the recycled gas mixture) during the second operation mode in order to keep the catalyst at the appropriate temperatures and activity level and in the appropriate gas mixture, and also to limit changes in pressure that may lead to mechanical fatigue of the reactor over time.

As the ammonia production process may be exothermal, the produced heat may be transported away from reactors and stored in a temperature storage medium, such as a liquid salt thermal storage based on a molten $NaNO_3$ and $KNO_3$ mixture. During subsequent low production of dihydrogen and renewable energy: the recycling of unreacted dinitrogen, dihydrogen and produced ammonia may occur through a high temperature recycle loop. The heat losses during prolonged low renewable and $H_2$ supply may be (at least partially) compensated by retrieving heat from the temperature storage medium. Next to such heat storage and recirculation system also thermal insulation of the reactor and heat storage and exchange system can be applied.

Hence, in embodiments, the first operation mode may comprise providing heat from the reactor and/or from the recycle loop, especially from a connector or heat exchanger (see below), and/or from a compressor feed to a temperature storage medium. In such embodiments, the second operation mode may comprise controlling a reactor temperature $T_R$ in the reactor, especially a catalyst temperature $T_C$, by providing heat from the temperature storage medium to the reactor and/or to the recycle loop, especially to the bypass. In further embodiments, the reactor temperature $T_R \geq 150°$ C., i.e., the reactor temperature $T_R$ may be controlled at a temperature $\geq 150°$ C., such as $\geq 200°$ C., such as $\geq 250°$ C., especially $\geq 300°$ C., such as $\geq 350°$ C. In further embodiments, the catalyst temperature $T_C \geq 150°$ C., i.e., the catalyst temperature TC may be controlled at a temperature $\geq 150°$ C., such as $\geq 200°$ C., such as $\geq 250°$ C., especially $\geq 300°$ C., such as $\geq 350°$ C. The temperature above which the reactor temperature $T_R$, especially the catalyst temperature $T_C$, is controlled may depend on the choice of the ammonia reaction catalyst; ammonia reaction catalysts may vary in the temperatures that result in the most efficient operation as well as in the temperatures that are detrimental to them. For example, in embodiments, the method may comprise controlling the reactor temperature $T_R$, especially the catalyst temperature $T_C$, at a temperature $\geq 150°$ C. for a Ru-based catalyst, whereas in further embodiments the method may comprise controlling the reactor temperature $T_R$, especially the catalyst temperature $T_C$, at a temperature $\geq 300°$ C. for an Fe-based catalyst.

In further embodiments, the temperature storage medium may comprise a medium selected from the group comprising concrete, silicon, and a molten salt. Especially, the temperature storage medium may comprise a molten salt. The molten salt may be particularly suitable as a temperature storage medium as the molten salt can be pumped around, and can thus be brought in proximity of a gas flow in order for the molten salt to be heated and/or to heat. Especially, a heat exchanger may be arranged between the molten salt and a gas flow, especially a plurality of gas flows, wherein the heat exchanger may be configured to provide heat from the (reactor) gas flow to the molten salt during the first operation mode and/or to provide heat from the molten salt to the (supply and/or bypass) gas flow during the second operation mode.

In further embodiments, the heat exchanger may comprise a three stream heat exchanger, wherein a first stream comprises the supply gas flow, wherein a second stream comprises the reactor gas flow, and wherein a third stream comprises a molten salt (flow).

In embodiments, the method may comprise generating dihydrogen using an electrolyser, especially an integrated battery and electrolyser also indicated as a battolyser, in dependence of availability of (renewable) energy sources. The method may further comprise providing the generated dihydrogen to the reactor, especially pre-mixed with dinitrogen. Hence, in embodiments, the method may comprise generating dihydrogen (with an electrolyser) when (renewable) energy is available, and providing the generated dihydrogen to the reactor. Thereby, the operation of the reactor may essentially directly be linked to the availability of renewable energy sources, which may provide relatively cheap and environmentally friendly ammonia production without the need for large dihydrogen storage.

The term "electrolyser" may herein especially refer to a device configured to split water into dihydrogen and dioxygen using electrical energy, especially to generate dihydrogen.

The method of the invention may be particularly suitable to operate a reactor depending on the availability of renewable energy sources. Hence, the method may comprise only operating the reactor when renewable energy is abundantly available. In practice, during large parts of the day and/or year, there may not be a renewable energy excess. Hence, in embodiments, the method may comprise operating the reactor in the second operation mode for at least 50% of the operation hours in a year, such as at least 60%, especially at least 70%, such as at least 75%.

For example, the second operation mode could generally be operational during low renewable electricity generation hours leading to low availability of hydrogen from electrolysis. Similarly, depending on the location the second operation mode may generally take place at night while the first operation mode may generally take place during about 6 hours at mid-day when particularly solar power is abundant, but also wind power is on average more abundant.

In principle, the method may comprise dynamic switching between the first operation mode and the second operation mode in dependence on the availability of dihydrogen (and/or dinitrogen). Hence, wherein the method may comprise switching between the operation modes multiple times in an hour, or even in a minute. In practice, however, the dihydrogen (and/or dinitrogen) availability may typically follow daily patterns, wherein several hours of renewable energy surplus are followed by several hours of renewable energy shortage. Hence, in embodiments, the second operation mode may last at least 2 hours, such as at least 3 hours, especially at least 4 hours on a day, or an entire night. It is also possible that there is a shortage of electricity for several days or even weeks, and then the second operation mode may take as long as that, where the heat storage capacity needs to be sufficiently large, and thermal insulation good to reduce heat loss to the environment.

Hence, in embodiments, the system, especially the reactor, may comprise thermal insulation.

Hence, the method may comprise operating the reactor in the first operation mode only during a relatively small time period, such as during ≤50% of the operation hours in a year, such as ≤40%, especially ≤30%, such as ≤25%. However, the total ammonia production requirement may remain similar, or may even increase in the future. Hence, during the first operation mode, a higher ammonia production rate than obtained with current reactors may be required during the operation hours.

In embodiments, the system may (thus) comprise a plurality of reactors. The plurality of reactors may not (all) operate at full power during intermediate $H_2$ availability hours. Hence, it may be beneficial to operate one reactor at full power reaching a higher temperature, and a second reactor, especially a second reactor sequentially arranged with the first reactor, operating at a lower power, heating up less but converting a higher fraction of dihydrogen to ammonia. In further embodiments, the second reactor (and any further reactors) may be functionally coupled to a respective bypass and/or to a respective heat exchanger.

Hence, in embodiments, the system may comprise a plurality of (sequentially arranged) reactors, especially at least three reactors, especially at least four reactors, such as at least five reactors, especially at least six reactors. Especially, the method may comprise providing a temperature gradient along the (sequentially arranged) reactors (during at least part of the method, especially during at least part of the first operation mode), wherein a first reactor of the (sequentially arranged) reactors has a first reactor temperature $T_{R1}$, and wherein a last reactor of the (sequentially arranged) reactors has a last reactor temperature $T_{Rn}$, wherein $T_{R1} > T_{Rn}$, more especially wherein the first reactor is arranged upstream of the last reactor with respect to the separator.

The phrase "temperature gradient along the reactors" herein especially refers to each of the reactors operating at a different reactor temperature, wherein starting from the first reactor, each successive reactor either has a higher or a lower reactor temperature than the previous reactor, i.e., $T_{Rn} < T_{Rn+1}$ for all n or $T_{Rn} < T_{Rn+1}$ for all n. The reactor temperature of each reactor may especially be measured at the same (respective) position.

In embodiments wherein the reactor comprises a plurality of reactors operating along a temperature gradient, the different reactors may also beneficially be coupled to respective temperature storage media configured to operate at a respective specific temperature. These respective temperature storage media may be configured to operate within different temperature ranges.

In embodiments, the reactor, especially each reactor, may comprise a plurality of reactor (catalytic) beds (also: "reactor subunits"). The plurality of reactor beds may not (all) operate at full power during intermediate $H_2$ availability hours. Hence, it may be beneficial to operate one reactor bed at full power reaching a higher temperature, and a second reactor bed, especially a second reactor bed sequentially arranged with the first reactor bed, operating at a lower power, heating up less but converting a higher fraction of dihydrogen to ammonia. In further embodiments, the second reactor bed (and any further reactor beds) may be functionally coupled to a respective bypass and/or to a respective heat exchanger.

Hence, in embodiments, the reactor may comprise a plurality of (sequentially arranged) reactor beds, especially at least three reactor beds, especially at least four reactor beds, such as at least five reactor beds, especially at least six reactor beds. Especially, the method may comprise providing a temperature gradient along the (sequentially arranged) reactor beds (during at least part of the method, especially during at least part of the first operation mode), wherein a first reactor bed of the (sequentially arranged) reactor beds has a first bed temperature $T_{B1}$, and wherein a last reactor bed of the (sequentially arranged) reactor beds has a last bed temperature $T_{Bn}$, wherein $T_{B1} > T_{Bn}$, more especially wherein the first reactor bed is arranged upstream of the last reactor bed with respect to the separator.

In embodiments wherein the reactor comprises a plurality of reactor beds operating along a temperature gradient, the different reactor beds may also beneficially be coupled to respective temperature storage media configured to operate at a respective specific temperature. These respective temperature storage media may be configured to operate within different temperature ranges.

In particular, a first reactor bed (operating at a higher temperature) may react fast, i.e., have a high conversion rate towards ammonia, but may not reach a high conversion (percentage). A second reactor bed with a bit lower temperature may not react as fast anymore but may convert to a higher conversion (percentage). A third reactor may again provide a lower reaction rate than the second reactor, but may convert towards a higher $NH_3$ concentration, etc.

In embodiments, the temperature storage medium may comprise a molten salt, wherein the molten salt may comprise a $NaKO_3$—$KNO_3$ mixtures or mixtures of $Ca(NO_3)_2$—$NaKO_3$—$KNO_3$, especially wherein the mixtures, especially the molten salt, is liquid between 125° C. and 590° C.

As the plurality of reactors and/or reactor beds may be operated at different temperature profiles, different ammonia reaction catalysts may be beneficially selected for different reactors and/or reactor beds. Hence, in embodiments, at least two of the reactors may comprise different ammonia reactor catalysts. In further embodiments, at least two of the reactor beds (in the same reactor) may comprise different ammonia reaction catalysts. Especially, a first reactor (bed) may comprise an ammonia reaction catalyst preferably operated at (relatively) high temperatures, such as an Fe-based catalyst, and the last reactor (bed) may comprise a ammonia reaction catalyst operable at (relatively) low temperatures, such as a Ru-based catalyst.

In further embodiments, the plurality of reactor beds may share a separator. Especially, the plurality of reactor beds may be sequentially arranged and may be functionally coupled to a shared separator.

In further embodiments, the plurality of reactor beds may be independently arranged and may be functionally coupled to respective separators.

In further embodiments, the system may comprise a plurality of reactors. The plurality of reactors may be functionally coupled to the same separator, recycle loop, heat exchanger etc. or may be coupled to reactor-specific separators, recycle loops and heat exchangers. In particular, the recycle loop may comprise a shared part functionally coupled with each of the reactors, but may further comprise reactor-specific parts functionally coupled to a specific reactor.

Hence, in embodiments, the plurality of reactors may be functionally coupled to a single temperature storage medium. In further embodiments, each of the plurality of reactors may be functionally coupled to a respective temperature storage medium.

In embodiments, the plurality of reactors may be functionally coupled to a single separator. In further embodiments, each of the plurality of reactors may be functionally coupled to a respective separator.

In embodiments, the plurality of reactors may be functionally coupled to a single heat exchanger. In further embodiments, each of the plurality of reactors may be functionally coupled to a respective heat exchanger.

A benefit of having a plurality of reactors may be a higher capacity (of the system).

In a second aspect, the invention may provide a system for (intermittent) ammonia production. The system may comprise one or more of a supply of dinitrogen and dihydrogen, a reactor configured for the production of ammonia from dinitrogen and dihydrogen, a recycle loop, a separator, a product outlet, and a controller. In embodiments, the supply may be functionally coupled to the reactor, especially via a supply inlet. The system may be configured to provide during operation a reactor gas mixture from the reactor to the recycle loop. The recycle loop may comprise or may be functionally coupled to a separator. The separator may be configured for extracting ammonia from the reactor gas mixture. In embodiments, at least part of the reactor gas mixture is provided from the recycle loop (back) to the reactor. In further embodiments, the controller may be configured to switch (operation of the reactor) between a first operation mode and a second operation mode. Especially, in the first operation mode dihydrogen and dinitrogen may be provided to the reactor, especially at a first supply rate $S_{a1}$, and the separator may be configured to provide a first fraction $F_1$ of the ammonia from the reactor gas mixture to the product outlet. Further, in the second operation mode the separator may be configured to provide a second fraction $F_2$ of the ammonia from the reactor gas mixture to the product outlet. Especially, the first fraction $F_1$ is larger than the second fraction $F_2$. In further embodiments, the controller may be configured to switch between the first operation mode and the second operation mode in dependence of dihydrogen availability to the system, especially to the reactor.

The invention may provide a system for (intermittent) ammonia production, especially a system configured to (intermittently) produce ammonia from dihydrogen and dinitrogen, especially based on the availability of renewable energy sources.

The system may comprise one or more of a supply of dinitrogen and dihydrogen, a reactor configured for the production of ammonia from dinitrogen and dihydrogen, a recycle loop, a separator, a product outlet, and a controller. In embodiments, the system may comprise a supply of dinitrogen and dihydrogen, a reactor configured for the production of ammonia from dinitrogen and dihydrogen, a recycle loop, a separator, a product outlet, and a controller.

In embodiments, the system may comprise a supply of dinitrogen and dihydrogen (also: "supply"), i.e., a supply configured to provide dinitrogen and dihydrogen (to the reactor). The supply may be functionally coupled to the reactor, especially via a supply inlet. The supply may be configured to provide dinitrogen and dihydrogen to the reactor. Especially, the supply may be configured to provide a (1:3) mixture of dinitrogen and dihydrogen to the reactor. The provided dinitrogen and dihydrogen may especially be pressurized, such as pressurized at at least 100 bar, such as at least 200 bar, especially at least 250 bar.

In further embodiments, the supply may comprise or be functionally coupled to a compressor feed configured to pressurize the dinitrogen and/or dihydrogen, especially coming from the source. The compressor feed may be functionally coupled to a source providing the dinitrogen and/or dihydrogen, especially functionally coupled to a dinitrogen source and to a dihydrogen source. The compressor feed may be configured to pressurize the dinitrogen and dihydrogen to at least 100 bar, such as at least 200 bar, especially at least 250 bar.

The pressurization may provide heat, thereby resulting in pressurized and hot dinitrogen and/or dihydrogen, which is provided to the reactor from the supply. In the inlet also an additional electric heater may be present if the compression and reaction heat is insufficient e.g. at starting up of the system. This electric heater may alternatively also be present in the molten salt heat supply coming from the storage system.

During operation, the reactor gas mixture exiting the reactor may comprise a combination of unreacted dinitrogen and dihydrogen as well as produced ammonia. Hence, the system may be configured to provide during operation a reactor gas mixture from the reactor to the recycle loop. The recycle loop may comprise or be functionally coupled to a separator. The recycle loop may further comprise or be functionally coupled to a (separator) bypass. The recycle loop may be configured to provide at least part of the reactor gas mixture to the reactor, via the separator and/or via the bypass. Thereby, the unreacted dinitrogen and dihydrogen can be returned to the reactor and may yet react to ammonia.

In embodiments, the recycle loop may be functionally coupled to a separator, especially wherein the separator is configured for extracting ammonia from the reactor gas mixture. Especially, the separator may extract a fraction of the ammonia from the reactor gas mixture, and may provide the remainder of the reactor gas mixture, including any non-extracted ammonia, to the recycle loop and/or the reactor.

In embodiments, the system may comprise a controller. The controller may be configured to control one or more of the supply, the reactor, the recycle loop, and/or the separator. In further embodiments, the controller may be configured to switch (operation of the reactor) between a first operation mode and a second operation mode.

In the first operation mode dihydrogen and dinitrogen may be provided to the reactor, especially at a first supply rate $S_{a1}$. In embodiments, in the second operation mode dihydrogen and dinitrogen may be provided to the reactor, especially at a second supply rate $S_{a2}$, more especially wherein $S_{a1} > S_{a2}$.

In embodiments, in the first operation mode, the separator may be configured to provide, especially to separate, a first fraction $F_1$ of the ammonia from the reactor gas mixture to the product outlet. In the second operation mode the separator may be configured to provide a second fraction $F_2$ of the ammonia from the reactor gas mixture to the product outlet. Especially, the first fraction $F_1$ is larger than the second fraction $F_2$.

In further embodiments, the separator may operate at a lower capacity during the second operation mode, especially the separator may essentially be "off" during the second operation mode, thereby resulting in $F_2 < F_1$.

In further embodiments, the recycle loop may comprise a (separator) bypass, wherein the second operation mode comprises providing (essentially all, such as ≥97%, especially ≥98%, such as ≥99%, including 100%, of) the reactor gas mixture from the recycle loop to the reactor via the bypass, i.e., without passing the reactor gas mixture through the separator, thereby resulting in $F_2 < F_1$. In further embodiments, $F_2$ may essentially be (reduced to) zero.

In embodiments, in the second operation mode the reactor gas mixture may be directly recycled to the reactor (via the bypass) bypassing the separator. However, some reactor gas mixture may be provided to the separator to maintain pressure in the separator. The recycled reactor gas mixture may be temperature controlled via the heat exchanger and/or the temperature storage medium. When resuming the first operation mode some liquid ammonia may be collected from the separator and/or the product outlet.

In further embodiments, the controller may be configured to switch between the first operation mode and the second operation mode in dependence of dihydrogen availability to the system, especially to the reactor. Hence, if ample dihydrogen is available, the controller may maintain or switch towards the first operation mode. If dihydrogen availability is low, the controller may maintain or switch towards the second operation mode. Especially, the controller may be configured to switch to the first operation mode if dihydrogen availability is above a first predetermined threshold and to switch to the second operation mode if the dihydrogen availability is below a second predetermined threshold. In further embodiments, the first predetermined threshold may be equal to the second predetermined threshold.

In embodiments, the separator may comprise a separator comprising a cooler or refrigerator with an ammonia catchpot from which liquid ammonia can be removed. In embodiments, the ammonia catchpot may comprise a gas path comprising a bend, especially such that a gas, such as the reactor gas mixture, passing through the ammonia catchpot must change direction within the ammonia catchpot, which may facilitate the removal of liquid ammonia. The ammonia catchpot may especially comprise a cooler.

Hence, in further embodiments, the separator may comprise a cooler. The cooler may be configured to cool the reactor gas mixture (provided to the separator), which may cause the ammonia to become liquid. Hence, the (liquid) ammonia may especially be extracted from a bottom side of the separator. Especially, the product outlet may be arranged at the bottom side of the separator.

During the second operation mode, some liquid ammonia may be formed in the separator. Especially, a fraction $F_2$ of the ammonia in the reactor gas mixture provided to the separator may be provided to the product outlet. In embodiments, the product outlet may, however, essentially be closed during the second operation mode. Hence, the liquid ammonia may accumulate at the bottom side of the separator, especially at the outlet, and may be extracted during the (next) first operation mode.

In embodiments, the reactor may be configured to operate at (its) full capacity when the supply of dihydrogen and dinitrogen provides dinitrogen and dihydrogen to the reactor at a capacity supply rate $S_c$, wherein during operation the supply of dihydrogen and dinitrogen provides dihydrogen and dinitrogen at an achievable supply rate $S_a$. The achievable supply rate $S_a$ may especially vary during operation of the reactor, and may during a part of operation time equal $S_c$, and during another part of operation time be less than $S_c$. Also during the first operation mode, $S_a$ may be lower than (or equal to) $S_c$. In such embodiments, the controller may be configured to operate the reactor: in the first operation mode if $S_a > 0.5\ S_c$; in the first operation mode or in the second operation mode if $0.3\ S_c \leq S_a \leq 0.5\ S_c$; and in the second operation if $S_a < 0.3\ S_c$. Hence, the controller may be configured to operate the reactor in dependence of dihydrogen availability, especially in dependence of the achievable supply rate $S_a$, and/or on one or more other criteria. For example, if ammonia demand is high, operation in the first operation mode at a relatively low achievable supply rate, such as at $0.3\ S_c$, may be (economically) preferable over operation in the second operation mode.

In further embodiments, the first fraction $F_1 \geq 5\%$, especially ≥20%, such as ≥50%, especially ≥80, such as ≥98%, especially ≥99%. The first fraction $F_1$ may essentially be as high as enabled by the separator. In further embodiments, the second fraction $F_2 \leq 50\%$, especially ≤10%, such as ≤3%, especially ≤2%, such as ≤1%, including 0%. Especially, the second fraction $F_2$ may essentially be zero.

Hence, in embodiments, the recycle loop may be configured to, during the second operation mode, provide (essentially all, such as ≥97%, especially ≥98%, such as ≥99%, including 100%, of) the reactor gas mixture (back) to the reactor. Especially, the recycle loop may be configured to, during the second operation mode, provide (essentially all, such as ≥97%, especially ≥98%, such as ≥99%, including 100%, of) the reactor gas mixture to the reactor via the bypass. In such embodiments, the separator may remain active, especially the cooler may be kept cool, but without an inflow of reactor gas mixture the separator may not require much power, especially the cooler will not require high cooling power, nor will it produce $NH_3$ for the product stream. The separator may have an equilibrium $NH_3$ vapor pressure, next to an $H_2$ and $N_2$ pressure and potentially some inerts pressure (some inert gas, such as some Ar from imperfect air separation, may typically be present in the $N_2$ feed).

In embodiments, the reactor may comprise an ammonia synthesis catalyst configured to catalyze the conversion of dihydrogen and dinitrogen to ammonia. In further embodiments, the ammonia synthesis catalyst may be selected from the group comprising an Fe-based catalyst and a Ru-based catalyst. In further embodiments, the ammonia synthesis catalyst may comprise a Ru-based catalyst. In further embodiments, the ammonia synthesis catalyst may comprise an Fe-based catalyst.

In further embodiments, in the first operation mode the system may be configured to provide heat from the reactor (catalyst beds) and/or from the recycle loop, especially from a connector (comprised by the recycle loop) arranged between the reactor and the bypass, and/or from a compressor feed to a temperature storage medium. In such embodiments, in the second operation mode the controller may control a reactor temperature $T_R$ in the reactor, especially a catalyst temperature $T_C$, by providing heat from the temperature storage medium to the reactor and/or to the recycle loop, especially to the connector arranged between the reactor and the bypass. The controller may especially be configured to control the reactor temperature $T_R \geq 150°$ C., i.e., the reactor temperature $T_R$ may be controlled at a temperature $\geq 150°$ C., such as $\geq 200°$ C., such as $\geq 250°$ C., especially $\geq 300°$ C., such as $\geq 350°$ C. In further embodiments, the catalyst temperature $T_C \geq 150°$ C., i.e., the catalyst temperature TC may be controlled at a temperature $\geq 150°$ C., such as $\geq 200°$ C., such as $\geq 250°$ C., especially $\geq 300°$ C., such as $\geq 350°$ C.

In further embodiments, the system may be configured to during the first operation mode provide heat from the recycle loop to the temperature storage medium. The recycle loop may be arranged to exchange heat with the temperature storage medium, especially a molten salt, such as in a counterflow arrangement. Especially, the recycle loop may comprise a connector arranged in contact with the reactor (catalyst bed) or in between the reactor (catalyst bed) and the bypass and/or between the reactor and the separator, and the system may be configured to provide heat from the connector, especially via a heat exchanger, to the temperature storage medium. By providing heat to the temperature storage medium at the connector, the reactor gas mixture may already be partially cooled prior to entering the separator, which may be arranged to cool the reactor gas mixture to provide liquid ammonia.

In further embodiments, the recycle loop may comprise or be functionally coupled to a heat exchanger arranged in contact with the reactor (catalyst bed) or in between the reactor (catalyst bed) and the bypass and/or between the reactor and the separator, and the system may be configured to provide heat from the heat exchanger to the temperature storage medium. By providing heat to the temperature storage medium at the heat exchanger, the reactor gas mixture may already be partially cooled prior to entering the separator, which may be arranged to cool the reactor gas mixture to provide liquid ammonia.

In embodiments, the heat exchanger may be arranged at the connector.

The heat exchanger may be configured for heating during the second operation mode, especially during bypass operation, and/or for cooling during the first operation mode, especially prior to providing the reactor gas mixture to the separator.

In further embodiments, the system may be configured to during the first operation mode provide at least part of the heat generated by the compressor feed to the temperature storage medium. In particular, the pressurization may provide a higher temperature than needed and/or desired for the operation of the reactor; it may thus be beneficial for both the temperature in the reactor and for temperature storage to divert heat from the compressor feed to the temperature storage medium.

In embodiments, the compressor feed may comprise a high pressure steam generator.

In further embodiments, the system may be configured to provide heat from the temperature storage medium to the compressor feed, especially during the second operation mode. In particular, the heat from the temperature storage medium may be applied in the second operation mode for providing steam for the compressor feed, especially in embodiments wherein the compressor feed comprises the high pressure steam generator.

In further embodiments, the system may be configured to provide heat from the temperature storage medium to the compressor feed, especially during switching from the second operation mode to the first operation mode, i.e., at one or more of the end of the second operation mode and the beginning of the first operation mode. Thereby, the heat from the temperature storage medium can be used to facilitate the compression of the $H_2$ and $N_2$ when $H_2$ is available again. In further embodiments, the system, especially the supply, may comprise or be functionally coupled to an electrolyser, especially a battolyser, configured to generate dihydrogen in dependence of availability of renewable energy sources. The electrolyser may be configured to provide the generated dihydrogen to the supply and/or to the reactor and/or to an intermediate hydrogen storage, especially to the supply.

In embodiments wherein the system comprises or is functionally coupled to a battolyser, the battolyser may be configured to provide electricity to the system during the second operation mode. In particular, at times of low renewable electricity availability, the battolyser can provide electricity to maintain the ammonia synthesis operational conditions in the low electricity consuming second operation mode with regards to the control system, gas circulation, especially of the bypass reactor gas mixture, and the separator, especially the cooling system. Alternatively, for example, also a battery can be applied for the purpose.

In further embodiments, the system, especially the supply, may comprise an intermediate hydrogen storage. The intermediate hydrogen storage may be functionally coupled to the electrolyser, wherein the electrolyser provides produced dihydrogen to the intermediate hydrogen storage. The intermediate hydrogen storage may further be functionally coupled to the supply, such that the supply can provide dihydrogen from the intermediate hydrogen storage to the reactor. The intermediate dihydrogen storage may especially be configured for the storage of an amount of dihydrogen sufficient to operate the reactor at full capacity for at least one hour. An advantage of such embodiment may be that switching between the first operation mode and the second operation mode may occur less frequent.

In embodiments, the reactor may comprise a plurality of reactor catalyst beds (also: "reactor beds"), especially a plurality of sequentially arranged reactor beds. In further embodiments, the reactor may comprise at least three reactor beds, such as at least four reactor beds, especially at least five reactor beds, such as at least six reactor beds. The (sequentially arranged) reactor beds may be arranged along a temperature gradient, especially wherein a first reactor bed of the sequentially arranged reactor beds has a first bed temperature $T_{B1}$, and wherein a last reactor bed of the sequentially arranged reactor beds has a last bed temperature $T_{Bn}$, especially wherein $T_{B1} > T_{Bn}$.

In embodiments, each of the reactor beds may be functionally coupled to a respective heat exchanger.

In further embodiments, each of the reactor beds may be functionally coupled to a respective temperature storage medium.

In embodiments wherein the reactor beds are sequentially arranged, the first reactor bed may be arranged upstream of the last reactor bed with respect to the separator.

In further embodiments, the system may comprise a gas flow device configured to provide one or more of (i) a supply gas flow from the supply to the reactor, especially via the (supply) inlet, (ii) a separation gas flow from the recycle loop, especially from the connector, to the separator, and (iii) a recycle gas flow from the separator to the reactor, especially via (at least part of) the recycle loop, (iv) a bypass gas flow from the recycle loop to the reactor via the bypass, especially essentially avoiding the separator, and (v) a reactor outlet gas flow from the reactor to the recycle loop, especially to the connector.

The supply gas flow may provide the dihydrogen and dinitrogen from the supply to the reactor. The system may be configured such that the supply gas flow provides heat to a temperature storage medium and/or accepts heat from it, especially, the supply gas flow may provide heat to the temperature storage medium, or especially the supply gas flow may accept heat from the temperature storage medium. In particular, during the initiation of operation the supply gas flow may often require heating (from the temperature storage medium). During full operation, the reactor gas mixture may also heat up the supply gas flow in a (counterflow) heat exchanger. Hence, in further embodiments, the supply gas flow may pass through (or along) a heat exchanger, especially a counterflow heat exchanger configured to counterflow the reactor gas mixture and the supply gas flow. In further embodiments, the supply gas flow may pass through (or along) a heat exchanger functionally coupled with the temperature storage medium, The separation gas flow may provide the reactor gas mixture from the recycle loop, especially from the connector, to the separator.

The recycle gas flow may provide the (remaining) reactor gas mixture from the separator to the reactor, especially via the supply, more especially via the compressor feed. Hence, in embodiments, the recycle gas flow may provide the remaining reactor gas mixture from the separator to the compressor feed, wherein the remaining reactor gas mixture is mixed with dihydrogen and dinitrogen from the supply, and wherein the supply provides the dihydrogen and dinitrogen, including the (remaining) reactor gas mixture to the reactor. Hence, in embodiments, the recycle gas flow may comprise the supply gas flow, i.e., the path of the recycle gas flow may comprise the path of the supply gas flow.

The bypass gas flow provides the reactor gas mixture from the recycle loop, especially from the connector, to the reactor. In embodiments, the bypass gas flow may provide the reactor gas mixture directly to the reactor, especially via a bypass inlet. In further embodiments, the bypass gas flow may provide the reactor gas mixture to the reactor via the supply inlet. Hence, the bypass gas flow and the supply gas flow may partially overlap. The reactor outlet gas flow provides the reactor gas mixture from the reactor to the recycle loop, especially to the connector.

In further embodiments, the gas flow device may comprise a ventilator, especially a bypass ventilator arranged in the bypass.

In further embodiments, the controller may be configured to control the gas flow device.

In further embodiments, the gas flow device may be configured to (or the controller may be configured to control the gas flow device to) in the first operation mode, provide at least the supply gas flow, the reactor outlet gas flow, the separation gas flow, and the recycle gas flow. In further embodiments, the gas flow device may be configured to (or the controller may be configured to control the gas flow device to) in the second operation mode, provide at least the reactor outlet gas flow and the bypass gas flow.

The bypass gas flow may provide a beneficial homogenization of temperatures during the second operation mode. In particular, it may be better to recirculate the product gas (for example by a simple kind of ventilator) since then the heat distribution can actively be controlled, especially in combination with the heat exchanger and its high temperature storage medium. Alternatively, only the supply gas flow and the separation gas flow could be switched off, but this may result in inhomogeneous temperatures during the second operation mode. A (low energy cost) bypass gas flow with temperature controlled by the heat exchanger may be preferable.

In embodiments, the system may comprise a Haber-Bosch plant. Especially, the invention may provide a modified Haber-Bosch plant that may have one or more of the following features: (i) one or more Haber Bosch reactor beds connected in a grid; (ii) a total capacity of all reactors together may be as high as the peak ammonia production that is required at highest renewable energy production. This may, for example be about 8 times the average production capacity; (iii) one or more of the reactor beds may be allowed to reduce somewhat in temperature because that will shift the reaction to the $NH_3$ side, which may release some additional heat; (iv) the electricity to run a pump or ventilator, especially the gas flow device, may be available from nearby batteries, or battolysers that combine $H_2$ production and battery storage. The recirculation pump may not require much energy. The electricity may also aid in keeping the temperature high by heating coils, especially arranged at the supply, such as at an inlet gas stream. The main energy consuming $H_2$ and $N_2$ compressor feed may not be required to run during the second operation mode at the moment that there is no $H_2$ production but just recirculation of the reactor gas mixture, i.e., if the achievable supply rate $S_a$ is essentially zero, there is no need for a compressor feed to be active. The cooling trap for separating ammonia from the reactor gas mixture may have (essentially) no load during the second operation mode.

In embodiments, the system may comprise an intermediate dihydrogen storage. If a little $H_2$ production is available the intermediate dihydrogen storage may first be filled and the reactor may then be filled (batchwise or continuously) from the intermediate storage in the second operation mode. Hence, the system may be configured to provide dinitrogen and dihydrogen batchwise during the second operation mode.

Especially, the system may provide one or more of the advantages: the ammonia reaction catalyst may be kept operational during off-peak hours (essentially during the second operation mode); the energy consuming compressor feed may be switched off during off-peak hours; during off-peak hours only low energy gas circulation pumps, especially the gas flow device, may be required for pumping the reactor gas mixture; in embodiments, also low energy liquid circulation pumps may be required for pumping the temperature storage medium, especially a molten salt.

In embodiments, the system, especially the controller, may be configured to execute the method as described herein.

In embodiments, the system may comprise a plurality of reactors, especially wherein each reactor is functionally coupled to a respective heat exchanger, and especially wherein each reactor is functionally coupled to a respective temperature storage medium, and especially wherein each reactor is functionally coupled to a respective bypass, and especially wherein each reactor is functionally coupled to a respective separator.

In further embodiments, the system may be configured to minimize heat losses, especially in order to keep the reactor conditions near a target temperature during the second operation mode. In further embodiments, the system may comprise thermal insulation.

Hence, in embodiments, the system may comprise a plurality of reactors, wherein the system is configured to minimize heat losses to maintain reactor conditions near a target temperature during the second operation mode.

The embodiments described herein are not limited to a single aspect of the invention. For example, an embodiment describing the method with respect to the first and/or second operation mode may, for example, also apply to the first and/or second operation mode of the system. Similarly, an embodiment of the system describing the separator, such as the cooler and/or the extraction, may, for example, further apply to the method.

The terms "upstream" and "downstream" relate to an arrangement of items or features relative to the propagation of gas flow from a reference position, wherein relative to a first position within the gas flow, a second position in the gas flow closer to the reference position is "upstream", and a third position within the gas flow further away from the reference position is "downstream".

The system may be part of or may be applied in e.g. electricity generation plants, wind power parks, solar power parks, Haber Bosch plants, ammonia plants, and shipping facilities. In embodiments, the system may be connected to the electricity grid. In further embodiments, the system may be configured to operate independently of the electricity grid.

In embodiments there will be a purge gas stream to purge inerts from the separator gas mixture, i.e. the system may comprise a purge unit configured to purge inerts from the recycle gas flow. The inerts purged by the purge unit may include Ar and $CH_4$ that result from the $N_2$ feed coming from the separator which can contain traces of these inerts. In embodiments, the purge unit may be configured to, during operation of the system, remove an amount of inerts equal to the amount of inerts continuously entering the system, i.e., the purge unit may be configured to maintain the inerts at a predefined (maximum) concentration. For example, during operation, especially in the first operation mode, 1-10% of the recycle gas flow 183 may be directed to the purge unit 190, thereby continuously removing (approximately) 1-10% of the inerts from the recycle gas flow 183. The hydrogen released via the purge stream may be recovered using a hydrogen recovery system and be added to the hydrogen inlet stream, i.e., the purge unit may comprise a hydrogen recovery system configured to recover dihydrogen from the purge gas flow and to provide the dihydrogen to the supply, especially to the intermediate dihydrogen storage, or especially to the compressor feed. In particular, the recycle gas flow may, during operation, be routed towards the purge unit, wherein the purge unit purges inerts from the system (in a purge gas flow), and wherein the purge unit provides a recovery gas flow comprising dihydrogen to the supply. In embodiments, the purge unit may especially comprise a pressure swing adsorption system, which may especially be configured to recover dihydrogen The purge and hydrogen recovery are known in the art; see e.g. M. Appl, Ammonia, 2. Production processes, Ullmann's Encyclopedia of Industrial Chemistry, Wiley-VCH Verlag GmbH & Co. KGaA, Weinheim, Germany, 2006 DOI: 10.1002/14356007.o02_o11.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
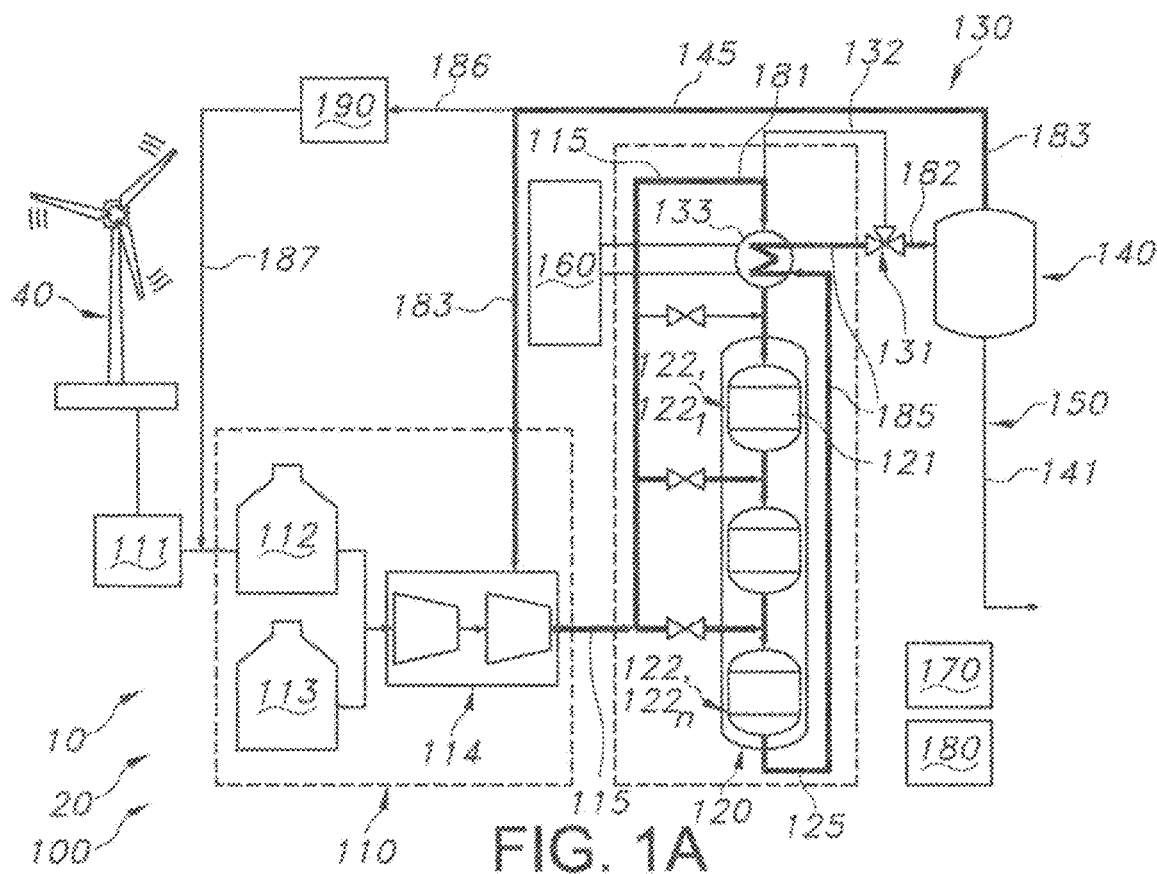
FIG. 1A-C schematically depict embodiments of the method and the system of the invention during operation.
Figure 1B:
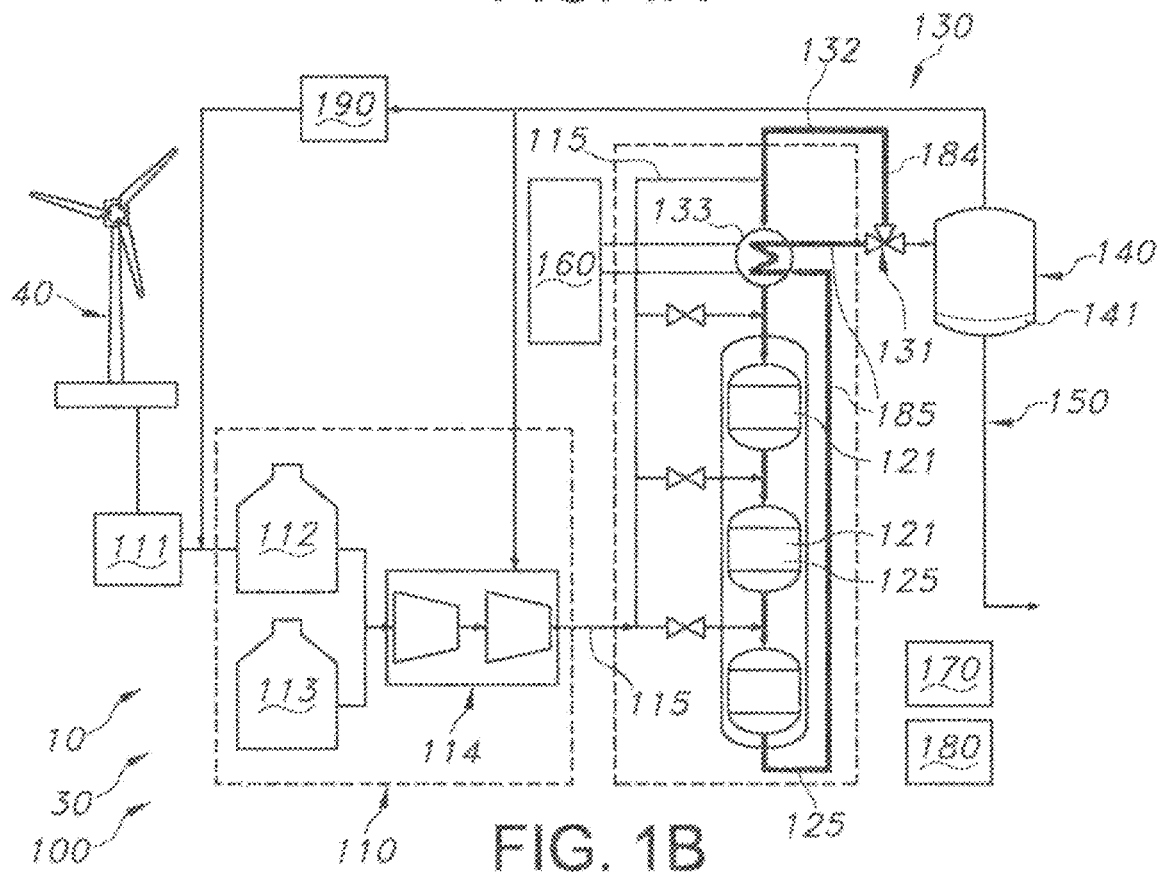
Figure 1C:
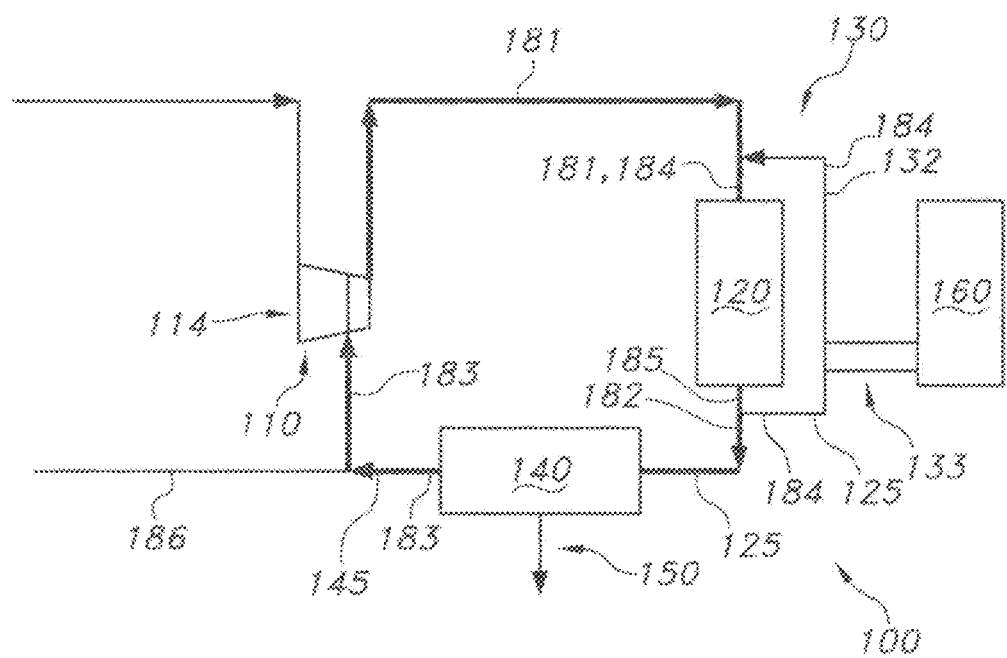

FIG. 1A-B schematically depict embodiments of the method 10 and the system 100 according to the invention. Specifically, FIG. 1A depicts embodiments of the method 10 and the system 100 in the first operation mode 20, whereas FIG. 1B depicts embodiments of the method 10 and the system 100 in the second operation mode 30. FIG. 1A-C schematically depict embodiments of the method 10 and the system 100 for ammonia production. The system 100 may comprise a supply 110 of dinitrogen and dihydrogen, a reactor 120, a recycle loop 130, a separator 140, a product outlet 150, and a controller 170. The method 10 may comprise reacting dihydrogen and dinitrogen 115, especially a mixture of dihydrogen and dinitrogen, to form ammonia in a reactor 120. In the depicted embodiment, the (multistage) compressor feed 114 compresses the dihydrogen and dinitrogen. The method 10 may further comprise providing a reactor gas mixture 125 from the reactor 120 to a recycle loop 130. The recycle loop 130 may comprise or be functionally coupled to a separator 140. The recycle loop may provide at least part of the reactor gas mixture 125 from the recycle loop 130 (back) to the reactor 120, especially via the compressor feed 114. The method 10 may comprise switching between a first operation mode 20 and a second operation mode 30. Hence, in embodiments, the recycle loop 130 may be functionally coupled to the compressor feed 114, especially wherein the recycle loop 130 is configured to provide the (remaining) reactor gas mixture 125 to the compressor feed 114 via the recycle gas flow 183. In particular, the recycle loop 130 may be configured to provide the (remaining) reactor gas mixture 125 to a multistage compressor feed 114 at a suitable stage, i.e., the compressor feed may successively increase the gas pressure of the mixture of $N_2$ and $H_2$ along a plurality of stages, and the remaining reactor gas mixture may have a higher gas pressure than the $N_2$ and $H_2$ provided by the respective intermediate storages, but a lower gas pressure than the gas pressure of the supply gas flow, therefore the remaining reactor gas mixture may be provided to the multistage compressor feed 114 at a suitable stage to further pressurize it. FIG. 1A schematically depicts the first operation mode 20. In the first operation mode 20 dihydrogen and dinitrogen 115 are provided to the reactor 120, especially via a supply gas flow 181. The reactor gas mixture 125 may be provided from the reactor 120 to the separator 140 via the recycle loop 130, especially via a reactor outlet gas flow 185 and a separation gas flow 182. The separator 140 may provide a first fraction $F_1$ of the ammonia from the reactor gas mixture 125 to a product outlet 150. Especially, the separator 140 may cool the reactor gas mixture 125 and provide liquid ammonia 141 to the product outlet 150, which may especially be extracted from the bottom of the separator 140. The remaining reactor gas mixture 145 may be provided from the separator 140 (back) to the compressor feed 114 for the inlet stream of the reactor 120, especially via a recycle gas flow 183.

FIG. 1B schematically depicts the second operation mode 30. In the second operation mode 30 the separator 140 may provide a second fraction $F_2$ of the ammonia from the reactor gas mixture 125 to the product outlet 150. Especially, during the second operation mode, the separator 140 may provide essentially no ammonia to the product outlet 150, i.e., $F_2$ may essentially be 0. In the depicted embodiment, the separator 140 may be partially closed off with respect to the recycle loop 130 and the product outlet 150. As some liquid ammonia 141 may still form during the second operation mode, some liquid ammonia 141 may collect at the bottom of the separator 140. In the second operation mode, the reactor gas mixture 125 may especially be provided from the recycle loop 130 to the reactor 120 via the (separator) bypass 132, especially via the bypass gas flow 184, especially using a bypass ventilator. Hence, in the depicted embodiment the recycle loop 130 provides essentially all, such as ≥97%, especially ≥98%, such as ≥99%, including 100%, of the reactor gas mixture 125 to the reactor 120 during the second operation mode 30, especially via the bypass 132.

Hence, in embodiments the system 100 may comprise a bypass ventilator arranged in the (separator) bypass 132. The bypass ventilator may be arranged to provide a gas flow, especially a gas flow comprising the reactor gas flow and the bypass gas flow. Such a gas flow may be beneficial, particularly during the second operation mode, to prevent a stagnant gas mixture, which could otherwise be detrimental to temperature control.

Hence, in embodiments, the first fraction $F_1$ is larger than the second fraction $F_2$, especially wherein the first fraction $F_1 \geq 5\%$, and wherein the second fraction $F_2 \leq 3\%$. The method 10 may further comprise switching between the first operation mode 20 and the second operation mode 30 in dependence of dihydrogen availability to the reactor 120. The depicted embodiments further show a renewable energy source 40, specifically a windmill. In further embodiments, the renewable energy source 40 may also comprise, for example, a solar panel. In further embodiments, the system 100 may be connected to the general electricity grid. For visualization purposes, the renewable energy source 40 is harvesting wind energy in FIG. 1A, and the method 10 and system 100 operate in the first operation mode 20. In contrast, the renewable energy source 40 is stationary (output negligible) in FIG. 1B, and the method 10 and system 100 operate in the second operation mode 30. In further embodiments, the renewable energy source 40 may, for example, comprise a solar panel. The renewable energy could also arrive via an electricity grid on which various variable sources are connected, including, for example, solar and/or wind power.

The renewable energy source 40 may provide energy intermittently, i.e., the availability of the renewable energy may vary depending on weather conditions. Further, the availability of the renewable energy may vary due to consumer energy needs. In embodiments, the method 10 may, for example, (thus) comprise operating the reactor 120 in the second operation mode 30 for at least 50% of the operation hours in a year, such as at least 60%, especially at least 70%, such as at least 80%.

In embodiments, the reactor 100 may comprise an ammonia synthesis catalyst 121 configured to catalyze the conversion of dihydrogen and dinitrogen to ammonia.

In embodiments, the recycle loop 130 may comprise a connector 131 arranged between the reactor 120 and the bypass 132 and/or between the reactor 120 and the separator 140. The connector 131 may especially be a segment of the recycle loop 130. The connector 131 may be configured to distribute the reactor gas mixture 125 between the separator 140 and the bypass 132. The recycle loop 130, especially the connector 131, may comprise a valve configured to control whether the flow of the reactor gas mixture to the bypass 132 and/or to the separator 140. In the depicted embodiment, the recycle loop, especially the connector, comprises a three-way valve.

In embodiments, a heat exchanger 133 may be arranged at the reactor inlet, especially along the supply gas flow 181.

In further embodiments, a heat exchanger 133 may be arranged at the recycle loop, especially along the reactor outlet gas flow 185.

In the depicted embodiment, the heat exchanger 133 is arranged at an intersection of the supply gas flow 181 and the reactor outlet gas flow 185.

In embodiments, the first operation mode 20 may comprise providing heat from the reactor 120 and/or from, especially via, the recycle loop 130 and/or from a compressor feed 114 to a temperature storage medium 160. In further embodiments, the first operation mode 20 may comprise providing heat from the reactor 120 and/or from, especially via, the recycle loop 130 and/or from the heat exchanger 133 to the supply gas flow. In the depicted embodiment, heat is provided to the temperature storage medium 160 and the supply gas flow 181 from the compressor feed 114, the reactor 120, and the recycle loop 130, specifically from the reactor outlet gas flow 185. In particular, heat is exchanged between the supply gas flow 181, the temperature storage medium 160 and the reactor outlet gas flow 185 via the heat exchanger 133.

In further embodiments, the heat exchanger may comprise a three stream heat exchanger, wherein a first stream comprises the supply gas flow, wherein a second stream comprises the reactor gas flow, and wherein a third stream comprises a molten salt (flow).

In further embodiments, the second operation mode 30 may comprise providing heat from the temperature storage medium 160 to the reactor 120 and/or to the recycle loop 130. In the depicted embodiment, the second operation mode 30 comprises providing heat from the temperature storage medium 160 to the recycle loop 130, especially to the reactor outlet gas flow 185, and to the supply gas flow 181. The providing of heat in the second operation mode 30 may be a passive process, i.e., the temperature storage medium 160 may act as a buffer. In further embodiments, the method 10 may comprise controlling a reactor temperature $T_R$ in the reactor 120 by providing heat from the temperature storage medium 160 to the reactor 120 and/or to the recycle loop 130, especially wherein the reactor temperature $T_R$ (is controlled) ≥150° C.

In embodiments, the controller 170 may be configured to control a reactor temperature $T_R$ in the reactor by providing heat, especially controlling the providing of heat, from the temperature storage medium 160 to the recycle loop 130 and/or to the reactor 120.

In further embodiments, the temperature storage medium 160 may comprise a molten salt. The use of a molten salt may be beneficial as the molten salt can be pumped around and through the heat exchanger 133. For example, in FIG. 1A the heat exchanger 133 functionally coupled to the temperature storage medium 160 is arranged along the supply gas flow 181 and may be heated thereby. However, in the second operation mode depicted in FIG. 1B, the heat exchanger 133 may be employed to specifically heat at the recycle loop 130. The heat exchanger may thus be configured to exchange heat between three system elements, especially flows: the supply gas flow 181, the reactor outlet gas flow 185, and the temperature storage medium 160.

In the depicted embodiment, the method 10 comprises generating dihydrogen using an electrolyser 111 in dependence of availability of renewable energy, especially from the renewable energy source 40. In the depicted embodiment, the electrolyser 111 provides the generated dihydrogen to an intermediate dihydrogen storage 112 configured to (temporarily) store dihydrogen. In further embodiments, an air purification system may be arranged between the electrolyser 111 and the intermediate dihydrogen storage 112, wherein the air purification system is configured to purify the dihydrogen provided to the intermediate dihydrogen storage 112.

The intermediate dihydrogen storage 112 may be functionally coupled to a compressor feed 114. The compressor feed 114 may further be functionally coupled to a dinitrogen storage 113. Especially, the compressor feed 114 may provide pressurized dinitrogen and dihydrogen 115 to the reactor 120.

In further embodiments, the electrolyser 111 may provide dihydrogen to the compressor feed 114 and/or to the reactor 120, especially to the compressor feed 114.

In the depicted embodiment, the compressor feed 114 comprises a multi-stage compressor feed, wherein each consecutive stage may be configured to raise the pressure further. Hence, the recycle gas flow 183 may be provided to a later stage (in the depiction the second/last stage) as the recycle gas flow 183 will still be somewhat pressurized.

In the depicted embodiment, the system further comprises a purge unit 190 configured to purge inerts from the recycle gas flow 183. Specifically, (part of) the recycle gas flow 183 may be directed to the purge unit 190 via the purge gas flow 186, especially via a (three-way) valve (not depicted). The purge unit may especially be configured to remove inerts from the system as inerts may otherwise accumulate as they do not react. In particular, the purge unit may be configured to remove argon and methane from the system. In further embodiments, the purge unit 190 may comprise a hydrogen recovery system configured to recover dihydrogen from the purge gas flow 186 and to provide the dihydrogen to the supply, especially to the intermediate dihydrogen storage 112, more especially to the air purification system, or especially to the compressor feed 114, via a recovered hydrogen gas flow 187. In the depicted embodiment, the recovered hydrogen gas flow 187 provides the recovered dihydrogen from the purge unit 190 to the intermediate dihydrogen storage 112. In alternative embodiments, the recovered hydrogen gas flow 187 may provide the recovered dihydrogen from the purge unit 190 to the compressor feed 114. For ease of operation, it may be preferable to provide the recovered dihydrogen to the intermediate dihydrogen storage 112 as the gas pressure of the recovered dihydrogen gas flow 187 may differ from the gas pressure of the intermediate dihydrogen storage 112, which would have to be accounted for when providing the recovered dihydrogen directly to the compressor feed 114.

In further embodiments, the system 100 may comprise a gas flow device 180 configured to provide one or more of (i) a supply gas flow 181 from the supply 110 to the reactor 120, (ii) a separation gas flow 182 from the recycle loop 130, especially from the connector 131, to the separator 140, (iii) a recycle gas flow 183 from the separator 140 to the reactor 120, especially via the supply 110 as in the depicted embodiment, (iv) a bypass gas flow 184 from the recycle loop 130 to the reactor 120 via the bypass 132, especially essentially avoiding the separator 140, (v) a reactor outlet gas flow 185 from the reactor 120 to the recycle loop 130, especially to the connector 131, (vi) a purge gas flow 186 from the recycle loop 130 to the purge unit 190, and (vii) a recovered dihydrogen gas flow 187 from the purge unit 190 to the intermediate dihydrogen storage 112.

Hence, in the first operation mode, depicted in FIG. 1a, the gas flow device 180 may be configured to provide: a supply gas flow 181 from the supply 110 to the reactor 120, especially wherein the supply gas flow 181 passes the heat exchanger 133 thereby providing heat to the temperature storage medium 160; a reactor outlet gas flow 185 from the reactor to the connector, especially wherein the reactor outlet gas flow 185 passes the heat exchanger 133 thereby providing heat to the temperature storage medium 160; a separation gas flow 182 from the connector 131 to the separator; and a recycle gas flow 183 from the separator 140 to the reactor 120, especially via the supply 110, more especially via the compressor feed 114, wherein the recycle gas flow 183 and the supply gas flow 181 merge/partially overlap. In further embodiments, during (at least part) of the operation, the gas flow device 180 may be configured to provide the purge gas flow 186 from the recycle loop 130 to the purge unit 190. In addition, the gas flow device 180 may be configured to provide during (at least part) of the operation a recovered dihydrogen gas flow 187 from the purge unit 190 to the intermediate dihydrogen storage 112.

In contrast, in the second operation, depicted in FIG. 1b, the gas flow device 180 may be configured to provide a reactor outlet gas flow 185 from the reactor to the connector, especially wherein the reactor outlet gas flow 185 passes the heat exchanger 133 thereby retrieving heat from the temperature storage medium 160; and a bypass gas flow 184 from the connector 131 to the reactor 120, especially wherein the bypass gas flow 184 passes the heat exchanger 133 thereby retrieving heat from the temperature storage medium 160.

In further embodiments, the compressor feed 114 may be the gas flow device 180, i.e., the compressor feed 114 may provide a pressurized gas, thereby providing one or more of the gas flows in the system 100. In further embodiments, the system may comprise the compressor feed 114 and an additional gas flow device 180.

In embodiments, the controller 170 may be configured to execute the method 10 as described herein, i.e., the controller 170 may control the system 100 to execute the method 10 as described herein.

In the depicted embodiment, the reactor 120 comprises a plurality of reactor beds 122. Specifically, in the depicted embodiment the reactor comprises a plurality of sequentially arranged reactor beds 122.

In embodiments, the method 10 may comprise providing a temperature gradient along the sequentially arranged reactor beds 122, wherein a first reactor bed 122,122₁ of the sequentially arranged reactor beds 122 has a first bed temperature $T_{B1}$, and wherein a last reactor bed 122,122$_n$ of the sequentially arranged reactor beds 122 has a last bed temperature $T_{Bn}$, wherein $T_{B1} > T_{Bn}$. In the depicted embodiment, each reactor bed 122 is functionally coupled with a valve to enable providing dihydrogen and dinitrogen 115 without the dihydrogen and dinitrogen 115 passing the heat exchanger 133, which may provide more options for temperature control in the reactor 120, as well as more options to control pressure. For example, the valves may be to compensate pressure loss from $NH_3$ formation in upstream beds. Hence, in embodiments, each reactor bed 122 may be functionally coupled with a respective bed supply inlet, especially wherein the respective bed supply inlet comprises a (two-way) valve.

FIG. 1C schematically depicts an embodiment of the method 10 and the system 100 according to the invention. In particular, the supply, especially the compressor feed 114, received $N_2$ and $H_2$ and compresses them to provide a supply gas mixture 181 to the reactor 120. In the reactor 120, $N_2$ and $H_2$ are reacted to form $NH_3$. The reactor provides a reactor outlet gas flow 185 comprising a reactor gas mixture. The reactor outlet gas flow 185 may be directed to the separation gas flow 182 on to the separator 140 and/or may be directed to the bypass gas flow 184 to proceed along the (separator) bypass 132.

The separator 140 may separate $NH_3$ from the reactor gas mixture and provide (liquid) $NH_3$ to the product outlet 150. The separator may further provide a recycle gas flow 183 comprising a remaining reactor gas mixture 145 to the compressor feed 114. In particular, the compressor feed 114 may comprise a multistage compressor feed configured to receive the recycle gas flow 183 at a suitable (later) compressor stage. Further, the recycle gas flow may be directed towards a purge unit 190 (not depicted).

The bypass gas flow 184 may direct the reactor gas mixture 125 back to the reactor 120 via the bypass 132. Further, in the depicted embodiment, the bypass gas flow 184 may pass a heat exchanger 133 configured to exchange heat between the bypass gas flow 184 and a temperature storage medium 160.

Figure 2A:
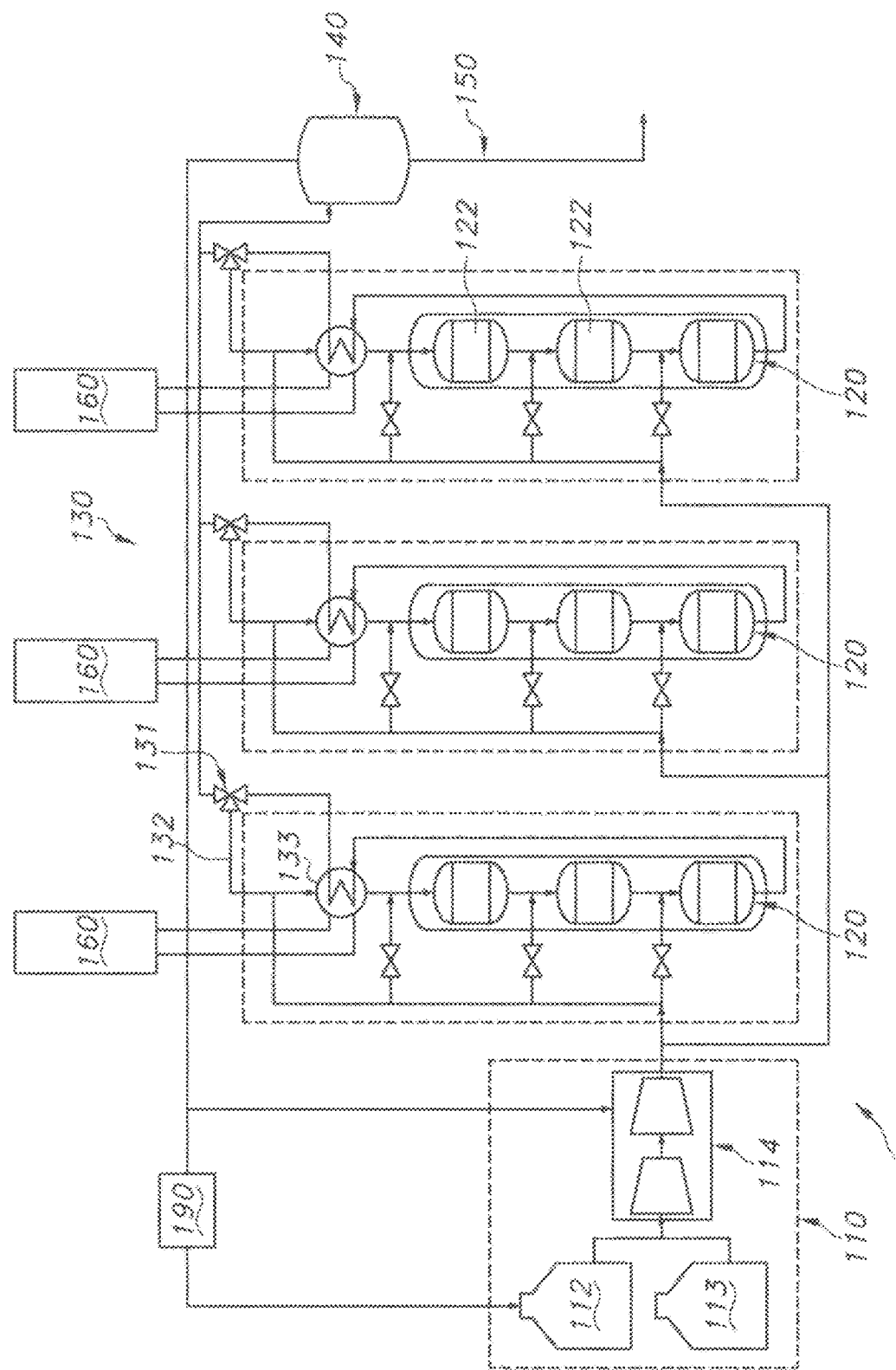
FIG. 2A-2B schematically depicts embodiments of the system comprising a plurality of reactor beds. The schematic drawings are not necessarily to scale.
Figure 2B:
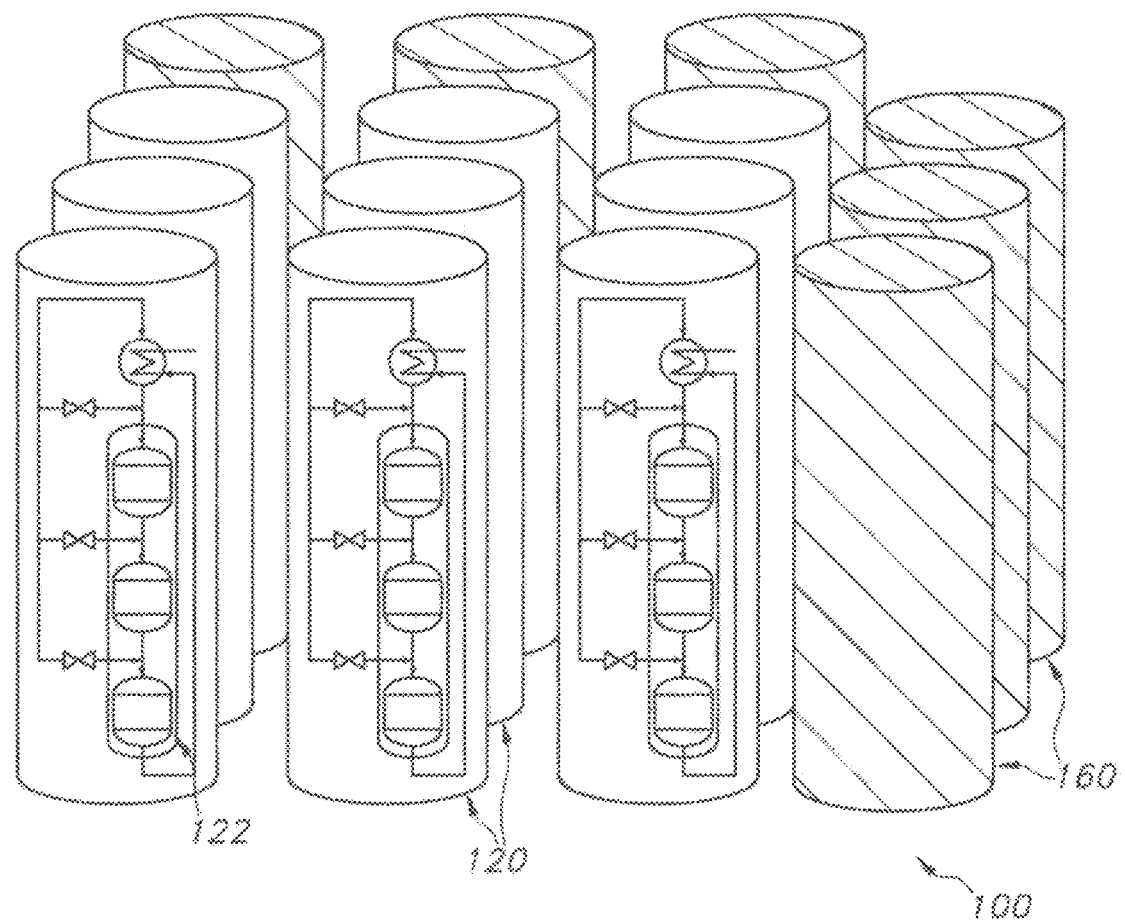

FIG. 2A-B schematically depict embodiments of the system 10 wherein the system comprises a plurality of reactors 120. An advantage of a plurality of reactors may be that depending on the supply level of dihydrogen one can operate one or more reactors in operation mode 1 and the remaining in operation mode 2. This results in a large operational flexibility to handle the varying availability of hydrogen between zero and a certain maximum.

In the embodiment depicted in FIG. 2a, each reactor 120 is functionally coupled to a respective heat exchanger 133 and a corresponding temperature storage medium. The three reactors 120 are, however, functionally coupled to the same separator 140 and product outlet 150. The recycle loop 130 is partially shared between the reactors 120 and partially separated into reactor-specific sections.

In further embodiments, the plurality of reactors 120 may be functionally coupled to a single temperature storage medium 160.

In further embodiments, each of the plurality of reactors 120 may be functionally coupled to a respective separator 140.

In further embodiments, the plurality of reactors 120 may be configured to operate at different pressures and/or temperatures, especially temperatures.

Hence, in embodiments, a plurality of (sequentially arranged) reactors may be configured to operate at different temperatures, and within at least one reactor a plurality of (sequentially arranged) reactors beds may be configured to operate at different temperatures.

FIG. 2b schematically depicts an embodiment wherein the plurality of reactors 120 is packed together to minimize heat loss. In addition, the reactors 120 are surrounded in all directions by the temperature storage medium 160 to further minimize heat loss in the reactors.

Hence, in embodiments, the system may comprise a plurality of reactors, wherein the plurality of reactors are packed together, i.e., arranged in close proximity to minimize heat loss to their environment.

The term "plurality" refers to two or more. Furthermore, the terms "a plurality of" and "a number of" may be used interchangeably.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. Moreover, the terms "about" and "approximately" may also relate to 90% or higher, such as 95% or higher, especially 99% or higher, even more especially 99.5% or higher, including 100%. For numerical values it is to be understood that the terms "substantially", "essentially", "about", and "approximately" may also relate to the range of 90%-110%, such as 95%-105%, especially 99%-101% of the values(s) it refers to.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

The term "further embodiment" and similar terms may refer to an embodiment comprising the features of the previously discussed embodiment, but may also refer to an alternative embodiment.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", "include", "including", "contain", "containing" and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system (also: "controller") that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings. Moreover, if a method or an embodiment of the method is described being executed in a device, apparatus, or system, it will be understood that the device, apparatus, or system is suitable for or configured for (executing) the method or the embodiment of the method respectively.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A method for ammonia production, the method comprising:

reacting dihydrogen and dinitrogen to form ammonia in a reactor; providing a reactor gas mixture from the reactor to a recycle loop, wherein the recycle loop comprises or is functionally coupled to a separator; and providing at least part of the reactor gas mixture from the recycle loop to the reactor; and switching between a first operation mode and a second operation mode, wherein: in the first operation mode dihydrogen and dinitrogen are provided to the reactor and the separator provides a first fraction $F_1$ of the ammonia from the reactor gas mixture to a product outlet, wherein the first operation mode comprises providing heat from the reactor and/or from the recycle loop to a temperature storage medium; and in the second operation mode the separator provides a second fraction $F_2$ of the ammonia from the reactor gas mixture to the product outlet, wherein the second operation mode comprises providing heat from the temperature storage medium to the reactor and/or to the recycle loop; wherein the first fraction $F_1$ is larger than the second fraction $F_2$, and wherein the method comprises switching between the first operation mode and the second operation mode in dependence of dihydrogen availability to the reactor.

2. The method according to claim 1, wherein the method comprises:

operating the reactor at full capacity with a supply of dihydrogen and dinitrogen at a capacity supply rate $S_c$, wherein during operation the supply of dihydrogen and dinitrogen is at an achievable supply rate $S_a$; and operating the reactor: in the first operation mode if $S_a>0.5S_c$; in the first operation mode or in the second operation mode if $0.3S_c \leq S_a \leq 0.5S_c$; and in the second operation mode if $S_a<0.3S_c$.

3. The method according to claim 1, wherein the first fraction $F_1 \geq 5\%$, and wherein the second fraction $F_2 \leq 3\%$.

4. The method according to claim 1, wherein during the second operation mode the recycle loop provides $\geq 97\%$ of the reactor gas mixture to the reactor.

5. The method according to claim 1, wherein the reactor comprises an ammonia synthesis catalyst configured to catalyze the conversion of dihydrogen and dinitrogen to ammonia.

6. The method according to claim 1, wherein the method comprises operating the reactor in the second operation mode for at least 50% of the operation hours in a year.

7. The method according to claim 1, wherein:
the second operation mode comprises controlling a reactor temperature $T_R$ in the reactor by providing the heat from the temperature storage medium to the reactor and/or to the recycle loop, wherein the reactor temperature $T_R \geq 150°$ C.

8. The method according to claim 1, wherein the temperature storage medium comprises a molten salt.

9. The method according to claim 1, wherein the method comprises switching to the first operation mode if dihydrogen availability is above a first predetermined threshold, and switching to the second operation mode if the dihydrogen availability is below a second predetermined threshold.

10. The method according to claim 1, wherein the method further comprises generating dihydrogen using an electrolyser in dependence of availability of renewable energy sources, and providing the generated dihydrogen to the reactor.

11. The method according to claim 1, wherein the reactor comprises at least four sequentially arranged reactor beds, wherein the method comprises providing a temperature gradient along the sequentially arranged reactor beds, wherein a first reactor bed ($122_1$) of the sequentially arranged reactor beds has a first bed temperature $T_{B1}$, and wherein a last reactor bed ($122_n$) of the sequentially arranged reactor beds has a last bed temperature $T_{Bn}$, wherein $T_{B1}>T_{Bn}$.

12. A system for ammonia production, the system comprising a supply of dinitrogen and dihydrogen, a reactor configured for the production of ammonia from dinitrogen and dihydrogen, a recycle loop, a separator a product outlet, and a controller, wherein the supply is functionally coupled to the reactor wherein the system is configured to provide during operation a reactor gas mixture from the reactor to the recycle loop, wherein the recycle loop comprises or is functionally coupled to the separator, and wherein at least part of the reactor gas mixture is provided from the recycle loop to the reactor, wherein the controller is configured to switch between a first operation mode and a second operation mode, wherein:
in the first operation mode dihydrogen and dinitrogen are provided to the reactor, and the separator is configured to provide a first fraction $F_1$ of the ammonia from the reactor gas mixture to the product outlet; and
in the second operation mode the separator is configured to provide a second fraction $F_2$ of the ammonia from the reactor gas mixture to the product outlet;
wherein the first fraction $F_1$ is larger than the second fraction $F_2$, and
wherein the controller is configured to switch between the first operation mode and the second operation mode in dependence of dihydrogen availability to the system;
wherein the first operation mode comprises providing heat from the reactor and/or from the recycle loop to a temperature storage medium, and
wherein the second operation mode comprises providing heat from the temperature storage medium to the reactor and/or to the recycle loop.

13. The system according to claim 12, wherein the reactor comprises an ammonia synthesis catalyst configured to catalyze the conversion of dihydrogen and dinitrogen to ammonia.

14. The system according to claim 12, wherein the reactor comprises at least four sequentially arranged reactor beds, wherein the sequentially arranged reactor beds are arranged along a temperature gradient, wherein a first reactor bed of the sequentially arranged reactor beds has a first bed temperature $T_{B1}$, and wherein a last reactor bed of the sequentially arranged reactor beds has a last bed temperature $T_{Bn}$, wherein $T_{B1}>T_{Bn}$.

15. The system according to claim 12, wherein the system comprises a gas flow device configured to provide one or more of (i) a supply gas flow from the supply to the reactor, (ii) a separation gas flow (182) from the recycle loop to the separator, (iii) a recycle gas flow from the separator to the reactor, (iv) a bypass gas flow from the recycle loop to the reactor via a bypass and (v) a reactor outlet gas flow from the reactor to the recycle loop.

16. The system according to claim 12, wherein the separator is selected from the group comprising a cooler and an ammonia collection catchpot in which liquid ammonia is condensed.

17. The system according to claim 12, wherein the system comprises a Haber-Bosch plant.

18. The system according to claim 12, wherein the system comprises a plurality of reactors, wherein the system is configured to minimize heat losses to maintain reactor conditions near a target temperature during the second operation mode.

* * * * *